(12) United States Patent
Thomas et al.

(10) Patent No.: US 9,998,793 B2
(45) Date of Patent: Jun. 12, 2018

(54) METHODS AND SYSTEMS FOR DETERMINING AT A PRESENT TIME A DATE AT A FUTURE TIME AT WHICH A MEDIA ASSET WILL BECOME AVAILABLE FROM THE CONTENT PROVIDER

(71) Applicant: Rovi Guides, Inc., Santa Clara, CA (US)

(72) Inventors: William L. Thomas, Evergreen, CO (US); Paul T. Stathacopoulos, San Carlos, CA (US); Walter R. Klappert, Los Angeles, CA (US)

(73) Assignee: Rovi Guides, Inc., San Jose, CA (US)

( * ) Notice: Subject to any disclaimer, the term of this patent is extended or adjusted under 35 U.S.C. 154(b) by 0 days. days.

(21) Appl. No.: 14/866,052

(22) Filed: Sep. 25, 2015

(65) Prior Publication Data

US 2017/0094361 A1  Mar. 30, 2017

(51) Int. Cl.
| | |
|---|---|
| *H04N 21/472* | (2011.01) |
| *H04N 21/262* | (2011.01) |
| *H04N 21/81* | (2011.01) |
| *H04N 21/488* | (2011.01) |
| *H04N 21/482* | (2011.01) |
| *H04N 21/466* | (2011.01) |
| *H04N 21/2543* | (2011.01) |
| *G06F 17/30* | (2006.01) |
| *H04N 21/4722* | (2011.01) |
| *H04N 21/278* | (2011.01) |
| *H04N 21/45* | (2011.01) |
| *H04N 21/462* | (2011.01) |

(52) U.S. Cl.
CPC ... *H04N 21/47214* (2013.01); *G06F 17/3056* (2013.01); *G06F 17/30522* (2013.01); *H04N 21/2543* (2013.01); *H04N 21/26283* (2013.01); *H04N 21/278* (2013.01); *H04N 21/45* (2013.01); *H04N 21/4532* (2013.01); *H04N 21/466* (2013.01); *H04N 21/4622* (2013.01); *H04N 21/4722* (2013.01); *H04N 21/482* (2013.01); *H04N 21/4821* (2013.01); *H04N 21/4826* (2013.01); *H04N 21/4882* (2013.01); *H04N 21/8173* (2013.01)

(58) Field of Classification Search
None
See application file for complete search history.

(56) References Cited

U.S. PATENT DOCUMENTS

| | | | | |
|---|---|---|---|---|
| 6,772,433 | B1 * | 8/2004 | LaJoie | H04N 21/84 |
| | | | | 348/E5.102 |
| 7,251,617 | B1 * | 7/2007 | Walker | G06Q 20/085 |
| | | | | 705/14.27 |
| 7,596,797 | B1 | 2/2009 | Kapner et al. | |
| 9,094,728 | B1 | 7/2015 | Hefner | |
| 2003/0105809 | A1 * | 6/2003 | Yoshii | H04L 29/06027 |
| | | | | 709/203 |
| 2003/0145326 | A1 | 7/2003 | Gutta | |
| 2010/0071007 | A1 * | 3/2010 | Meijer | H04N 5/782 |
| | | | | 725/58 |

(Continued)

*Primary Examiner* — Hoang Vu A Nguyen Ba
(74) *Attorney, Agent, or Firm* — Haley Guiliano LLP

(57) ABSTRACT

Methods and systems are described for a media guidance application that manages user access to content provided by a plurality of content providers. In particular, the media guidance application may automatically manage and recommend content providers which a user should request access to.

18 Claims, 14 Drawing Sheets

(56) References Cited

U.S. PATENT DOCUMENTS

| | | | |
|---|---|---|---|
| 2010/0169913 A1* | 7/2010 | Ellis | H04N 21/454 |
| | | | 725/25 |
| 2011/0119698 A1* | 5/2011 | Paxton | H04N 7/17336 |
| | | | 725/28 |
| 2012/0311633 A1 | 12/2012 | Mandrekar et al. | |
| 2013/0276022 A1* | 10/2013 | Tidwell | H04N 21/2547 |
| | | | 725/34 |
| 2015/0012615 A1 | 1/2015 | Hefner | |
| 2015/0312604 A1 | 10/2015 | Hoctor | |
| 2016/0142783 A1* | 5/2016 | Bagga | H04N 21/47214 |
| | | | 725/47 |
| 2016/0249105 A1* | 8/2016 | Carney Landow | G06F 17/3082 |
| 2017/0094332 A1 | 3/2017 | Thomas et al. | |

* cited by examiner

600

```
600 ...
601 Initialization Subroutine
602 ...
603 //Routine to recommend additional media content based on a content provider
      recommendation :
604
605  Receive instances of subscription start dates corresponding to the content
      provider
606  For each subscription start date:
607    A = Accessed value of the instance of subscription start date
608    B = Accessed value of stored date media asset of interest to the user becomes
       available
609       If (A-B)< 0)
610           Then: Execute Subroutine to recommend additional media content
       based on the days between A and B using control circuitry
611       Else If (A==B)
612           Then: Execute Subroutine to add content provider and start date to
       list of candidate subscriptions using control circuitry
613       Else
614           Execute Subroutine to compute a new subscription start date using
       control circuitry
615  Execute Subroutine to display a list of possible subscriptions and corresponding
      additional media content recommendations
616 ...
617 Termination Subroutine
618 ...
```

800 ...
801 Initialization Subroutine
802 ...
803 //Routine to identify a content provider having a media asset of interest to a user:
804
805　Receive instances of media assets that are of interest to the user
806　For each media asset:
807　　　Query database for entries matching the media asset
808　　　　　If (Number of matching entries > 0)
809　　　　　　　Then: Retrieve a date available and a subscription period from database entries matching the media asset of interest to the user
810　　　　　　　　　Execute Subroutine to identify possible start dates and subscription periods using control circuitry and store in data in a memory
811　　　　　Else if (Number of similar entries >0)
812　　　　　　　　Execute Subroutine to store content provider and similar media assets in a memory using control circuitry
813　　　　　Else
814　　　　　　　Execute Subroutine to retrieve another media asset of interest to the user that is currently unavailable
815　　　Execute Subroutine to recommend a subscription based on the candidate list of content providers
816 ...
817 Termination Subroutine
818 ...

FIG. 8

900
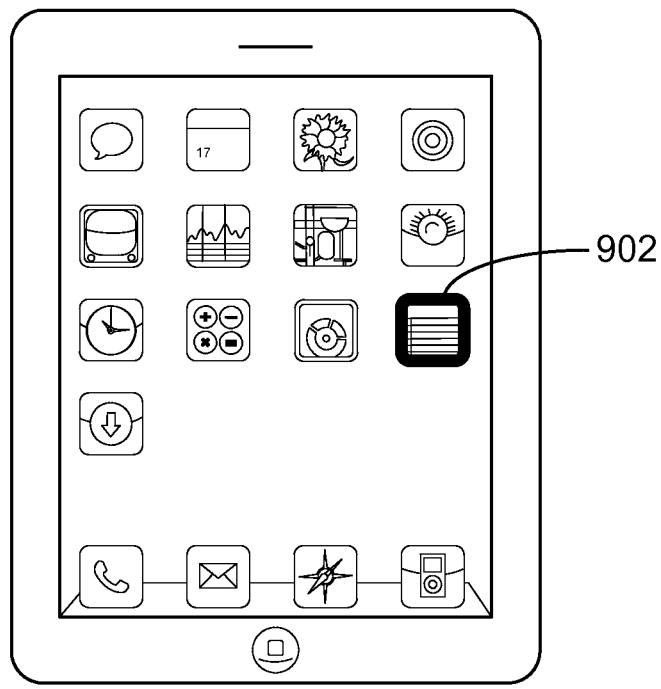
950
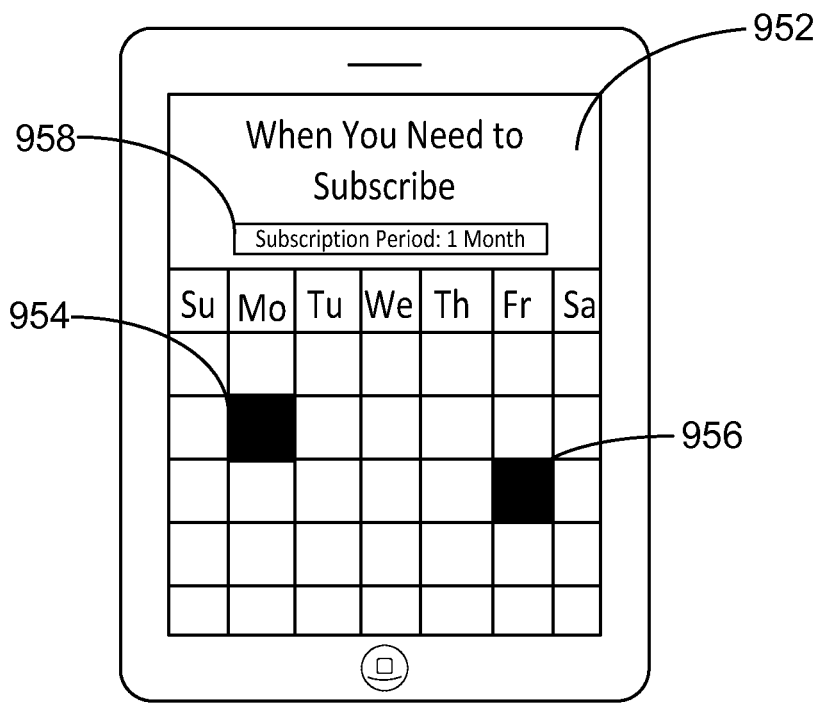
FIG. 9

1300

```
1300 ...
1301 Initialization Subroutine
1302 ...
1303 //Routine to determine subscription terms based on a user profile and user
     profile characteristics of interest to a content provider:
1304
1305  Receive a user profile characteristic of interest to the user
1306  For each user profile characteristic of interest to the user:
1307   A = Accessed value of the user profile characteristic of interest to the user
1308   B = Accessed value of stored user profile
1309       If (calculate_degree_of_similarity(A, B)>=threshold value)
1310           Execute Subroutine to determine subscription terms based on the
     degree to which the user profile characteristic matches the user profile using
     control circuitry
1311       Else If (calculate_degree_of_similarity(A, B)<=threshold value)
1312           Execute Subroutine to determine subscription terms based on the
     number of users subscribing to the content provider using control circuitry
1313       Else
1314           Execute Subroutine to determine subscription terms based on
     standard subscription terms using control circuitry
1315  Execute Subroutine to transmit the subscription terms to the content provider in
     a subscription request using control circuitry and network circuitry
1316 ...
1317 Termination Subroutine
1318 ...
```

1500 ...
1501 Initialization Subroutine
1502 ...
1503 //Routine to identify user profile characteristics of interest to a content provider matching a user profile:
1504
1505 Receive instances of user profile characteristics
1506 For each user profile characteristic:
1507    Query database containing user profile data corresponding to the content provider for entries matching the user profile characteristic
1508       If (Number of matching entries > 0)
1509          Execute Subroutine to enumerate all database entries matching the user profile characteristic using control circuitry
1510       Else If (Number of similar entries > 0)
1511          Execute Subroutine to enumerate the number of similar database entries weighted by a similarity of the entry using control circuitry
1512       Else
1513          Execute Subroutine to remove user profile characteristics from a list of user profile characteristics of interest to the content provider using control circuitry
1514 Execute Subroutine to identify user profile characteristics of interest to the content provider based on the enumerated profile characteristics using control circuitry
1515 ...
1516 Termination Subroutine
1517 ...

FIG. 15

METHODS AND SYSTEMS FOR DETERMINING AT A PRESENT TIME A DATE AT A FUTURE TIME AT WHICH A MEDIA ASSET WILL BECOME AVAILABLE FROM THE CONTENT PROVIDER

BACKGROUND

In conventional systems, a user may receive access to a media library by subscribing to a media service and paying a recurring fee. The media service may change the media available to the user from the library on a recurring basis. Oftentimes, a user must pay for multiple subscriptions to have access to all media of interest to the user. Due to the recurring changes to the media available in a media library, a user may not be aware of the media offered by a service. In some instances, a user may inadvertently pay for two services offering overlapping content. In other instances, a user may pay for a subscription while no media of interest to said user is offered by the service. In another instance, the user may have a first subscription to a first content provider and may be unaware that a second content provider may offer lower pricing on similar content. Likewise, content providers may have difficulty in targeting users. For example, a content provider may be unaware of users who may be strong candidates to acquire. Thus, the user may waste money paying for excess subscriptions or may waste time searching for desirable media, or content providers may waste money targeting a group of users that are not strong candidates to acquire.

SUMMARY

Accordingly, methods and systems are described herein for a media guidance application that adapts media content subscriptions according to the interests of the user. For example, the media guidance application may receive and process a plurality of streams of data from different sources to automatically determine content offerings, billing cycles, etc., in order to minimize overlaps in media content provided by different subscriptions, eliminate subscriptions that do not offer media content of interest to a user, and maximize the amount of media content of interest to a user during a subscription period. Advantageously, by processing the plurality of streams of data, the media guidance application relieves the user of the time-consuming and tedious burden of managing the various subscriptions.

In particular, the media guidance application may recommend a media subscription to a user, along with start and end times for said subscription, based on information about the user. The media guidance application may aggregate billing for each of the subscriptions such that a user only needs to pay a single bill for multiple subscriptions. For example, the media guidance application may determine that a user prefers to watch the shows "Game of Thrones," offered during the winter on a Home Box Office ("HBO") subscription and "WrestleMania," offered during the spring on a World Wrestling Entertainment ("WWE") Network subscription. The media guidance application may inform the user to subscribe to HBO during the winter, on a day including or before the start time of the show "Game of Thrones." The media guidance application may subsequently inform the user to cancel the HBO subscription on a day including or after the show "Game of Thrones" is no longer available on HBO. The media guidance application may likewise inform the user to subscribe to WWE Network when "WrestleMania" is available in the spring.

The media guidance application may also recommend subscriptions to a user based on viewing habits. For example, the media guidance application may identify the show "Orange is the New Black" (offered by Netflix) as having similar characteristics to "Game of Thrones" and "WrestleMania" and may recommend a Netflix subscription when "Orange is the New Black" becomes available.

Furthermore, the media guidance application may aggregate the charges for the HBO, Netflix, and WWE Network subscriptions such that the user pays a single entity for all the subscriptions, as well as provide other services related to automatically managing multiple subscriptions for the user, such as arbitrating the automatic activation and termination to said subscriptions and automatically negotiating subscription terms with the content provider.

In some aspects, the media guidance application may determine that a media asset of interest to a user is currently unavailable. For example, the media guidance application may retrieve user profile data identifying a media asset that is of interest to the user. For example, the media guidance application may retrieve data identifying "Game of Thrones" in a list of favorite shows corresponding to a user. Furthermore, the media guidance application may access a remotely or locally stored program list that identifies media assets that are currently available to the user (e.g., a television programming schedule). The media guidance application may compare the program list with the media asset of interest to the user to determine whether the media asset of interest to the user is currently available. For example, the media guidance application may search the programming schedule for the show "Game of Thrones."

The media guidance application may then compare the media asset with a database listing media assets that will become available from various content providers to identify a content provider from which the media asset will be available. For example, the media guidance application may access a remote or local database listing shows that will become available, at a future date or time, from various content providers. The media guidance application may compare the media asset of interest to the user, such as "Game of Thrones," with media assets in the database to identify a content provider that will offer the media asset of interest to the user. For example, the media guidance application may identify HBO as a content provider of the show "Game of Thrones."

The media guidance application may compare the media asset with a database listing dates at which media assets will become available from the content provider to identify a date at which the media asset will become available from the content provider. Following from the previous example, the media guidance application may access a remote or locally stored programming schedule corresponding to HBO (i.e., a content provider). The media guidance application may compare the programming schedule with the show "Game of Thrones" to identify a start time (e.g., a first air date and time for an episode corresponding to the show) when the content is first available.

The media guidance application may compare the date in a database listing date ranges associated with different subscription periods for the content provider to determine a subscription period that includes the date. For example, the media guidance application may access a remote or local database listing possible subscription periods for the channel HBO. For example, the media guidance application may access a database listing subscription periods for HBO (e.g., month to month, quarterly, yearly, etc.) and/or subscription start dates (e.g., beginning of a month, anytime, middle of a month, etc.). The media guidance application may then search for a subscription period and/or date combination comprising the date on which the media asset of interest to the user becomes available.

The media guidance application may determine a start date for the subscription period. For example, the media guidance application may identify the start date as a subscription start date associated with the identified subscription period described above. In another example, the media guidance application may choose a date near the date on which the media asset becomes available as the start date (e.g., in order to prompt the user to subscribe before the start date).

The media guidance application may generate for display, on a display screen, a reminder to the user to request access to the content provider on the start date. For example, the media guidance application may generate for display a message on a display screen associated with a media guidance application reminding the user to subscribe to the content provider (e.g., HBO).

In some embodiments, the media guidance application may request access to the content provider on the start date. For example, the media guidance application may automatically activate a subscription to a content provider to provide access to the media content of interest to the user on the start date. For example, the media guidance application may automatically establish an account from the content provider by, for example, transmitting a packet to the content provider requesting a new account beginning on the start date. In another example, the media guidance application may request access to the content provider on the start date in response to receiving input from a user instructing the media guidance application to request access on the start date.

In some embodiments, the media guidance application may generate for display an option to subscribe to the content provider in addition to the reminder. For example, the media guidance application may generate for display a button on a message reminding a user to subscribe to a content provider. The user may select the button to subscribe to the content provider.

In some embodiments, the media guidance application may generate for display a date at which the media asset will become available from the content provider in the reminder. For example, the media guidance application may display a date along with the reminder informing the user when the media asset of interest to the user will become available.

In some embodiments, the media guidance application may generate for display a recommendation for an additional media asset that is similar to the media asset and available from the content provider before the date. For example, the media guidance application may access a database listing media assets that are available on HBO between the start date and the date on which "Game of Thrones" becomes available. The media guidance application may access user profile data containing show preferences corresponding to the user (e.g., a user preference for murder-dramas). The media guidance application may then search the database for a media asset matching the preference (e.g., murder-dramas) to identify a matching media asset, such as an episode of the series "The Sopranos." The media guidance application may generate for display the recommendation to the user.

In some embodiments, the media guidance application may generate for display the reminder on the start date. For example, the media guidance application may generate for display a reminder to subscribe to HBO (i.e., the content provider) on the start day in order to prompt the user to subscribe.

In some embodiments, the media guidance application may determine a number of days between the date and the start date. For example, the media guidance application may compute on control circuitry associated with the media guidance application the number of days between the date that the show "Game of Thrones" becomes available and the start date. In some embodiments, the difference may be zero. For example, the start date may be the day that the media asset becomes available.

In some embodiments, the media guidance application may generate for display, on the display screen, media asset recommendations based on the number of days. For example, the media guidance application may calculate seven days between the start date and the date that the media asset of interest to the user will become available. The media guidance application may compute a media asset recommendation for each day.

In some embodiments, the media guidance application may determine a day of the week between the date and the start date. For example, the media guidance application may access a user profile to determine a day of the week where the user watches the most television (e.g., consumes the most television media assets). The media guidance application may identify Friday as a day of the week between the start date and the date (i.e., the date that the media asset of interest to the user will become available) where the user watches the most television relative to other days of the week within the same period.

In some embodiments, the media guidance application may generate for display, on the display screen, a recommendation for an additional media asset based on the day of the week. For example, the media guidance application may identify Friday as described above. The media guidance application may identify media assets available from the content provider, such as HBO, on Friday. The media guidance application may compare data from a profile corresponding to the user with media assets available from the content provider (e.g., HBO) on Friday. The media guidance application may generate for display a media asset matching the user profile data.

In some embodiments, the media guidance application may determine that the user is currently subscribed to the content provider. For example, the media guidance application may access subscription status information saved on a memory accessible to the media guidance to determine that the user is currently subscribed to the content provider, such as HBO.

In some embodiments, the media guidance application may determine an end date of a current subscription period of the user. For example, the media guidance application may determine an end date of the current subscription period by sending a query, containing data identifying the user and requesting a subscription end date, to a server corresponding to the content provider (e.g., an HBO server). The media guidance application may compute the end date of the subscription based on a query received from the server.

In some embodiments, the media guidance application may generate for display, on the display screen, the reminder to the user to request access to the content provider on the end date. For example, the media guidance application may display a message, on a display screen associated with the media guidance application, prompting the user to extend the subscription (e.g., a message informing a user to renew his or her HBO subscription).

In some embodiments, the media guidance application may automatically extend a subscription for the user. For example, the media guidance application may determine a subscription period of 2 months as described above. The media guidance application may automatically renew a subscription to the content provider by, for example, sending a packet to the content provider requesting an additional month of access, in order to provide access to the media content of interest to the user for the full period.

In some embodiments, the media guidance application may automatically cancel a subscription to a content provider. For example, the media guidance application may transmit a packet to the content provider requesting termination or suspension of an active subscription to the content provider on the end date as computed above (e.g., to reduce unnecessary spending on a subscription when media content of interest to the user is not available).

In some embodiments, the media guidance application may determine a number of media assets that are of interest to the user that become available from the content provider during the subscription period. For example, the media guidance application may access a listing of all media assets that will become available to the user between the start date of the subscription and the day that the subscription will end. The media guidance application may access data in a profile corresponding to the user to identify a preference of said user. The media guidance application may compare the preference with the metadata corresponding to the listing of all media assets to identify media assets matching the preference. The media guidance application may enumerate the identified media assets to determine the number of media assets that are of interest to the user.

In some embodiments, the media guidance application may compare the number to a threshold number. For example, the media guidance application may access, from a memory associated with the media guidance application, a user-selected number representing a minimum number of media assets available from a content provider. For example, the media guidance application may receive user input indicating a threshold minimum number of media assets required from a content provider for a subscription recommendation. The media guidance application may compare the threshold number to the number of media assets that are of interest to the user.

In some embodiments, the media guidance application may select the subscription period based on the number exceeding the threshold. For example, the media guidance application may select a subscription period such that during the entire subscription period at least the threshold number of media assets is available to the user.

In some embodiments, the media guidance application may compare the number of media assets that are of interest to the user that become available from the content provider during the subscription period to a price corresponding to the subscription. For example, the media guidance application may query the media content provider for a price associated with the subscription period (e.g., monthly, daily, one-time cost). The media guidance may receive a price associated with the subscription period from the content provider and may use the price to identify a value (e.g., to the user) associated with the subscription by, for example, by dividing the price by a weighted number of media assets that are of interest to the user that become available from the content provider. The media guidance application may determine a weighting for the media assets by, for example, accessing a media asset wish list (e.g., a list comprising media assets that the user wants to watch) and giving higher weighting to media assets that are listed in the media asset wish list.

In some aspects, the media guidance application may increase a value (e.g., to the user and the content provider) of a subscription by negotiating subscription terms with a content provider for a recommended content subscription. For example, the media guidance application may negotiate terms that comprise a subscription discount to increase the value of the subscription to the user by lowering the subscription cost (i.e., thus increasing the value as described above), and increase the value of the subscription to the content provider by incentivizing the user to subscribe to the content provider (e.g., because of the lower subscription cost the user may subscribe whereas they might not otherwise).

The media guidance application may identify user profile characteristics that may be of interest to a content provider, such as user behavior or demographic data. The media guidance application may compare data from the profile of the user to the user profile characteristics of interest to the content provider to determine a degree to which the user profile matches the profile characteristics. Based on a degree to which the user profile matches the profile characteristics, the media guidance application may determine subscription terms and transmit the terms to the content provider. For example, the media guidance application may determine that a user profile of a first user matches the user profile characteristics very closely (e.g., 96% match by calculating a match as described below). The media guidance application may access subscription term criterion (e.g., criterion provided by the content provider mapping a match to a discount) to determine the subscription terms. For example, the media guidance application may identify subscription term criterion specifying that a user whose profile matches the user profile characteristics very closely (e.g., 95% match or more) is entitled to a 50% discount. Accordingly, the media guidance application may determine subscription terms comprising a 50% discount for the user and may transmit the terms to the content provider. In contrast, the media guidance application may determine subscription terms for a second user that does not match the user profile characteristics closely (e.g., 8% match) to comprise a discount smaller than 50% (i.e., because the content provider is more interested in acquiring the first user than the second user).

In some embodiments, the media guidance application may retrieve a user profile from memory. For example, the media guidance application may retrieve user profile data from a remote or local database listing demographic data related to the user, a viewing history, or data either manually input or automatically derived (e.g., by the media guidance application) about the user. For example, the media guidance application may use the user profile to identify information and traits about the user. The information and traits identified by the media guidance application may be used to determine a degree to which the user matches user profile characteristics of interest to a content provider.

In some embodiments, the media guidance application may search a database of media assets available from a plurality of content providers to identify a plurality of media assets matching a user preference. For example, the media guidance application may determine that a user prefers to watch romantic comedies. Accordingly, the media guidance application may subsequently search a database of media assets for all media assets matching the romantic comedy genre. The media guidance application may identify media assets matching a user preference to identify media content that is of interest to the user. For example, the media guidance application may use the identified media content to determine if a content provider provides access to content that is of interest to the user.

In some embodiments, the media guidance application may identify a first subset of the plurality of media assets available from a first content provider of the plurality of content providers, wherein the user requires a first subscription to the first content provider to access the first subset. For example, the media guidance application may group the media assets, by, for example, examining metadata related to each of the media assets, to determine a content provider for the media asset. Based on identifying a content provider, the media guidance application may associate the media asset with a subset corresponding to the content provider. The media guidance application may group the media assets to determine an amount of media assets that may be of interest to the user from the content provider. As an example, the media guidance application may only recommend a content provider to a user if a threshold number of media assets matching the user profile are available.

In some embodiments, the media guidance application may identify a subscription associated with a content provider of the content providers by, for example, querying the content provider for a cost (e.g., monthly, daily, one-time cost) to get access to the subset of media assets. The media guidance application may retrieve the subscription cost to use as a basis for a discount or basis for a recommendation (e.g., the media guidance application may use the cost to determine the value of a 10% discount or may use the cost to determine whether the subscription costs are greater than a budget saved in the user profile).

In some embodiments, the media guidance application may retrieve first user profile characteristics of interest to the first content provider. For example, the media guidance application may query the content provider for characteristics of a user that are of most interest to the content provider. For example, the media guidance application may detect that the content provider generates most of its revenue by displaying advertisements. Subsequently, the media guidance application may receive, from the content provider, user profile characteristics corresponding to users who frequently watch and click through advertisements. In another example, the media guidance application may automatically identify profile characteristics of interest to the content provider automatically by, for example, identifying a typical demographic associated with a content provider and retrieving user profile characteristics associated with the typical demographic. The media guidance application may use the first user profile characteristics to determine whether a user profile matches user profile characteristics of interest to the content provider to identify whether the user is one that would be of interest to the content provider to acquire.

In some embodiments, the media guidance application may compare the first user profile characteristic to the user profile. For example, the media guidance application may compare data in the user profile with the retrieved user profile characteristics to identify how closely the user profile matches the user profile characteristics. The media guidance application may use the results of the comparison to identify a discount for the user to a subscription to the content provider.

In some embodiments, the media guidance application may, based on comparing the first user profile characteristic to the user profile, determine a degree to which the first user profile characteristic corresponds to the user profile. For example, the media guidance application may use a fuzzy matching algorithm to identify a score (e.g., a percent) representative of how closely the user profile and the user profile characteristics match. Based on the degree to which the user profile matches the first user profile characteristic, the media guidance application may determine a discount corresponding to the user for a subscription to the content provider.

In some embodiments, the media guidance application may, based on the degree to which the first user profile characteristics correspond to the user profile, determine first subscription terms for the first subscription. For example, the media guidance application may determine that the user profile matches the user profile characteristics of interest to the user with a score of 90%. The media guidance application may access a lookup table of score-discount pairs to determine a promotion (e.g., one month free) for a user having a score of 90%. The media guidance application may use the degree to determine a discount for a subscription to the content provider corresponding to the user, because, for a user having a higher degree, the content provider may be more interested in acquiring the user.

In some embodiments, the media guidance application may transmit a first subscription request featuring the first subscription terms to the first content provider. For example, the media guidance application may generate a packet for transmission over a data network connected to the media guidance application, comprising the first subscription terms, as determined by the media guidance application, to the content provider.

In some embodiments, the media guidance application may retrieve the user profile from memory in response to detecting that the user is going to cancel a second subscription to a second content provider. For example, the media guidance application may determine that a user has selected a "Cancel Subscription" button (e.g., by detecting user input at a user input device, such as a touch on a touchscreen) displayed on a display screen accessible to the media guidance application. In response to detecting the user input, the media guidance application may retrieve the user profile.

In some embodiments, the media guidance application may detect that the user is going to cancel the second subscription to the second content provider by detecting that the first subset will no longer be available from the second content provider at a future date. For example, the media guidance application may determine that a user interested in the television show "Game of Thrones" may wish to cancel a subscription to the content provider after a current season of "Game of Thrones" is over by, for example, determining that a user has only consumed "Game of Thrones" media from the content provider over the course of a year.

In some embodiments, the media guidance application may identify first user characteristics including user demographic data, viewing history, user price preferences, user media consumption rate, user commercial viewing preferences, and retail purchase information if the characteristics are of interest to the content provider. For example, the media guidance application may identify that a content provider generates revenue by selling downloadable media assets. Therefore, the media guidance application may identify retail purchase information, such as information identifying that a user purchases downloadable media assets, to be of interest to the content provider.

In some embodiments, the media guidance application may receive information from the user to populate the user profile, wherein the information is compared to the first user profile characteristics to determine the degree to which the first user profile characteristics correspond to the user profile. For example, the media guidance application may receive demographic information from a user used to populate the user profile of the user. The media guidance application may store the user profile data in memory. The media guidance application may use the demographic data in comparing the user profile to the first user profile characteristics.

In some embodiments, the media guidance application may generate for display to the user a first promotion for the first subscription based on the information. For example, the media guidance application may identify a promotion, such as a discount on a subscription to the content provider, and may generate for display the promotion to the user on a display screen accessible to the media guidance application.

In some embodiments, the media guidance application may receive an update to the information from the user. For example, the media guidance application may generate for display a slider to allow a user to adjust various parameters, such as a total cost, subscription length, etc., and may detect user input, for example, through input into a remote control, to update a parameter.

In some embodiments, the media guidance application may generate for display to the user a second promotion for the first subscription based on the updated information. For example, the media guidance application may detect that a user has requested an adjusted subscription length from 12 months to six months. The media guidance application may generate for display a second promotion associated with the content provider for the shorter subscription term.

In some embodiments, the media guidance application may identify a second subset of the plurality of media assets available from a second content provider of the plurality of content providers, wherein the user requires a second subscription to the second content provider to access the second subset. For example, the media guidance application may determine, using the user profile, that the user is interested in romantic comedies. The media guidance application may identify a second subset of romantic comedies that are available from a second content provider upon payment of a subscription cost.

In some embodiments, the media guidance application may retrieve second user profile characteristics of interest to the second content provider. For example, the media guidance application may query the second content provider for user profile characteristics of interest to the second content provider, such as a propensity for a user to pay for additional media assets or watch advertisements. The media guidance application may receive the second user profile characteristics to identify whether the user profile matches user profile characteristics of interest to the content provider.

In some embodiments, the media guidance application may, based on comparing the second user profile characteristic to the user profile, determine a degree to which the second user profile characteristics correspond to the user profile. For example, the media guidance application may use a fuzzy comparison algorithm to determine to what degree the user profile and the user profile characteristics match. The media guidance application may use the degree to determine a discount for the user to the second content provider.

In some embodiments, the media guidance application may, based on the degree to which the second user profile characteristic correspond to the user profile, determine second subscription terms for the second subscription. For example, the media guidance application may determine that a user does not correspond closely to the user profile characteristics of interest to a content provider (e.g., has a degree score of 5% out of 100%). Based on the determination, the media guidance application may determine the second subscription terms to be substantially the same as standard, undiscounted subscription terms. For example, the media guidance application may determine that when a degree score is low (e.g., below a threshold score received from the content provider), the content provider may not be interested in acquiring a user.

In some embodiments, the media guidance application may transmit a second subscription request featuring the second subscription terms to the second content provider. For example, the media guidance application may generate a packet for transmission over a wireless network for which the media guidance application is connected, comprising the second subscription terms, and may transmit the message to the second content provider.

In some embodiments, the media guidance application may compare a value to the user of the first subscription with a value to the user of the second subscription. For example, the media guidance application may compute the value to the user of the first and second subscriptions as described above. The media guidance application may compare the computed value of the first subscription with the computed value of the second subscription to identify a subscription having a greater value. In some embodiments, the media guidance application may automatically subscribe to the subscription having the greater value or may display a recommendation to the subscription having a greater value to the user. For example, the media guidance application may send a packet to the content provider having the greater value requesting activation of a new account as described above or the media guidance application may display a pop up message recommending the subscription on a display screen accessible to the media guidance application.

In some embodiments, the media guidance application may retrieve a subscription term criterion from the first content provider, wherein the subscription term criterion indicates subscription terms acceptable to the first content provider based on the profile. For example, the media guidance application may receive a criterion, such as a minimum age, a minimum degree score, etc., for a user to qualify for a set of subscription terms. For example, the media guidance application may receive a discount and subscription length corresponding to a user who matches the user profile characteristics of interest to the content provider by 90%. The media guidance application may use the criterion to generate for display subscription terms to the user.

In some embodiments, the media guidance application may notify the first content provider of the second subscription request. For, example, the media guidance application may notify the first content provider by sending a packet to the first content provider indicating a second subscription request has been sent by the media guidance application. In another example, the media guidance application may notify the first content provider that the subscription terms of the second content provider have a lower cost than the subscription terms of the first content provider. The media guidance application may notify the first content provider of the second subscription request to allow for the first content provider to modify the first subscription terms based on the information about the second subscription request.

In some embodiments, the media guidance application may query the first content provider for an updated subscription term criterion. For example, the media guidance application may query the first content provider for a lower cost in response to notifying the first content provider that the subscription terms of the second content provider have an associated lower cost.

In some embodiments, the media guidance application may receive an updated subscription term criterion based on the user subscribing to both the first content provider and the second content provider. For example, the media guidance application may receive a criterion identifying subscription terms for a subscription to both the first and the second content providers, based on the user profile data. For example, the media guidance application may receive subscription terms such that the two content providers are bundled into a single subscription.

In some embodiments, the media guidance application may transmit a first subscription request, wherein the first subscription request includes a threshold number of users that will subscribe to the first content provider at the first subscription terms. For example, the media guidance application may identify 10,000 users to subscribe to a content provider. The media guidance application may request a 5% discount on a standard subscription price if all 10,000 users are signed up for the subscription.

It should be noted that the systems, methods, apparatuses, and/or aspects described above may be applied to, or used in accordance with, other systems, methods, apparatuses, and/or aspects.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 6 is pseudocode illustrative of an algorithm for recommending additional media content based on a content provider recommendation in accordance with some embodiments of the disclosure;

FIG. 8 is pseudocode illustrative of an algorithm for identifying a content provider having a media asset of interest to a user in accordance with some embodiments of the disclosure;

FIG. 9 shows an illustrative example of a user device showing a subscription reminder in accordance with some embodiments of the disclosure;

FIG. 13 is pseudocode illustrative of an algorithm for determining subscription terms based on a user profile and user profile characteristics of interest to a content provider in accordance with some embodiments of the disclosure;

FIG. 15 is pseudocode illustrative of an algorithm for identifying user profile characteristics of interest to a content provider matching a user profile in accordance with some embodiments of the disclosure;

DETAILED DESCRIPTION OF DRAWINGS

Figure 1:
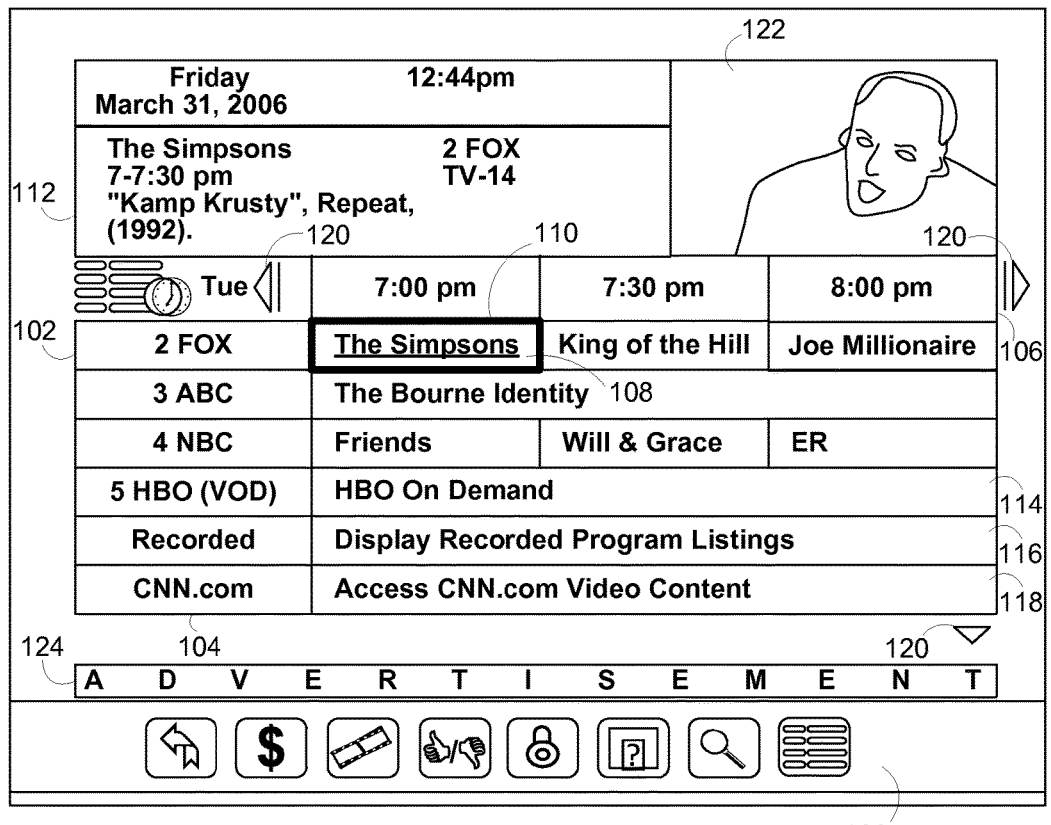
FIG. 1 shows an illustrative example of a media guidance display that may be presented in accordance with some embodiments of the disclosure.

Methods and systems are described herein for a media guidance application that adapts media subscriptions according to the interests of the user. In particular, the media guidance application may recommend a media subscription to a user, along with start and end times for said subscription, based on profile information about the user, such as media content interests or a budget input by the user. The media guidance application may aggregate billing for each subscription such that a user only needs to pay a single bill for multiple media subscriptions. Subscriptions to various media content providers may be arbitrated automatically by the media guidance application requiring little to no user input. The media guidance application may seek discounts to media content subscriptions to optimize a value of the subscription for both the user and the content provider.

As referred to herein, the term "in response to" refers to initiated as a result of. For example, a first action being performed in response to another action may include interstitial steps between the first action and the second action. As referred to herein, the term "directly in response to" refers to caused by. For example, a first action being performed directly in response to another action may not include interstitial steps between the first action and the second action.

As referred to herein, "media subscription" refers to any product or service where a user pays a recurring or one-time fee in return for media content. For example, a media subscription may comprise payment of a subscription fee in exchange for access to a media library (provided by a content provider) for a subscription period. As referred to herein, a "content provider" may be any entity offering a media subscription. For example, a content provider may be a television network such as HBO. In some embodiments, a content provider may be a streaming service such as Hulu. The content provider may charge a subscription fee as part of a media subscription.

As referred to herein, a "subscription fee" may be any recurring or one-time payment made in exchange for access to media. For example, a subscription fee may be a monthly access charge for access to a HBO media library. In another example, a subscription fee may be a yearly charge to access a Hulu media library. As referred to herein, a "media library"

refers to any media that is accessible via the media subscription. For example, a media library offered by a HBO subscription may include all movies, television shows, etc., aired on HBO channels, or may include all movies, television shows, etc. offered on demand to a user. In some media subscriptions, a media library is only accessible to a user during a subscription period.

As referred to herein, a "subscription period" is an amount of time in which a media library is accessible to a user. For example, upon payment of a monthly HBO subscription fee, a user may access a HBO media library for a month (i.e., the subscription period). In some examples, a content provider may offer a fixed number of days in a subscription period. For example, a content provider may offer monthly, quarterly and yearly subscription periods. A user may wish to access a media library for only two weeks. In this example, the user must pay at least the subscription fee for the monthly subscription period (i.e., the shortest subscription period) to access the media library for the two weeks.

In some embodiments, a user may access a media subscription via a media guidance application. As referred to herein, a "media guidance application" is an application that enables users to access media content through an interface. Media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Media guidance applications may generate graphical user interface screens that enable a user to navigate among, locate and select content. In some examples, a media library from media subscription is accessible to a user via a media guidance application.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Media guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

In some embodiments, the media guidance application may retrieve a user profile indicating content that is of interest to a user. For example, the media guidance application may determine whether a user profile exists by first identifying the user (e.g., login information, a picture of the user (e.g., gained through a webcam), a hash value uniquely identifying the user or any other known identifying information of the user), and then by comparing the user's identity against entries of a user profile database. As a result of the comparing, the media guidance application may receive a pointer to a profile if one is located or may receive a NULL value if the profile does not exist. The user profile database may be located remote or local to the media guidance application and may be accessible to the media guidance application over a network connection. If a user profile is located, the media guidance application may access database entries corresponding to previously viewed media by the user.

In some embodiments, the media guidance application may analyze previously viewed media to identify a pattern between the media. For example, the media guidance application may enumerate episodes of a series to estimate user interest in a series. For example, the media guidance application may retrieve a user profile containing data indicating that a user has watched 20 episodes of the television show "Game of Thrones." The media guidance application may receive data indicating that only 20 episodes of the television series "Game of Thrones" are currently available to the user. Based on a comparison of the number of episodes watched by the user to the number of episodes currently available to the user, the media guidance application may determine that the user is interested in the television series "Game of Thrones."

The media guidance application may access a remote or local database containing metadata corresponding to the show "Game of Thrones" to determine whether a user has viewed all possible episodes of "Game of Thrones." If the user has not viewed all episodes of "Game of Thrones" (e.g., there are 30 episodes outstanding but the user only viewed 20), the media guidance may identify episodes 21-30 as media assets of interest to the user. In another example, the media guidance application may retrieve data from a user profile indicating a list of favorite media content. The media guidance application may correlate the data with media assets to identify media assets of interest to the user. For example, a listing of favorite musicians may be manually input by a user via an input device connected to the media guidance application and stored in a user profile by the media guidance application. The media guidance application may identify a new album (i.e., media asset) corresponding to a musician from the listing of favorite musicians as a media asset of interest to the user.

In some embodiments, the media guidance application may identify a plurality of media assets of interest to the user. For example, as described above, the media guidance application may identify multiple episodes of the television series "Game of Thrones" as media assets of interest to the user. In another example, the media guidance application may identify a favorite series from a listing of favorite series manually input by the user via an input device connected to the media guidance application and stored in the user's profile. The media guidance application may search a remote database, such as a cloud based database listing episodes of a series to identify a listing of episodes associated with the series (i.e., a plurality of media assets of interest to the user).

In some embodiments, the media guidance application may receive a priority associated with a media asset of interest to the user. For example, the media guidance application may receive, via an input device connected to the media guidance application an input indicating that the television show "Game of Thrones" is a high priority series (i.e., the subscriber greatly desires for the show "Game of Thrones" to be in a recommended subscription. The media guidance application may recognize the "high priority" designation and may recommend a subscription comprising episodes of the show "Game of Thrones" if episodes of the show are not yet available to the user. In contrast, the media guidance application may identify that the television show "House of Cards" is a media asset of interest to the user but is a low priority series (e.g., by identifying a low priority designation stored in the user profile or by enumerating a number of times a user watches the series). Accordingly, the media guidance application may identify a subscription in which episodes of the series "Game of Thrones" are available before identifying a subscription in which episodes of the series "House of Cards" is available.

In some embodiments, the media guidance application may determine that a media asset of interest to the user is currently unavailable. For example, the media guidance application may identify a media asset of interest to the user as described above. The media guidance application may retrieve, from a remotely or locally accessible data source, information about media assets currently available to a user. For example, the media guidance application may access a television program schedule listing episodes of television shows that are scheduled for display on channels subscribed to by a user. In another example, the media guidance application may retrieve a listing of media available on demand to a user. The media guidance application may compare the listing of media currently available to the user with the media asset of interest to the user to identify a match. If no match is found, the media guidance application may determine that the media asset of interest to a user is currently unavailable.

In some embodiments, the media guidance application may compare the media asset with database listing media assets that will become available from various content providers to identify a content provider from which the media asset will be available. For example, the media guidance application may access a remote or local database containing information about new media assets that will be available from each content provider. For example, the media guidance application may access a listing of television shows, movies, documentaries, etc., that will become available via HBO, Showtime, Hulu, etc., for the upcoming month, quarter, year, etc. Following with the previous example, the media guidance application may search the listing of upcoming programming corresponding to HBO, Showtime, Hulu, etc. for the television show "Game of Thrones."

The media guidance application may search databases associated with content providers with which a user does not have a media subscription. The media guidance application may determine that the television show "Game of Thrones" will become available from the content provider HBO and from the standalone streaming service HBO GO. In another example, the media guidance application may identify the movie "Pulp Fiction" as a media asset of interest to a user. The media guidance application may identify a plurality of content providers, each with the movie "Pulp Fiction" available at a future date.

In some embodiments, the media guidance application may search a subset of content providers matching a user setting. For example, the media guidance application may retrieve a user preference indicating a preference for regularly scheduled programming over streaming or on demand media. The media guidance application may filter content providers based on the user preference. For example, the media guidance application may filter the content providers such that only content providers offering regular scheduled programming, as opposed to streaming content providers, are identified.

In some embodiments, the media guidance application may infer a subscription setting preference corresponding to the user. For example, the media guidance application may access a viewing history corresponding to the user in the user profile. The media guidance application may identify that the user chooses to consume media assets on a television about 70% of the time by enumerating the viewing history of the user. The media guidance application may identify a weighting, such as 0.7, to media assets which are formatted for viewing on a television and may give a weighting of 0.3 to media assets which are formatted for viewing on other devices (e.g., a mobile device or computer).

In some embodiments, the media guidance application may prompt the user for content provider parameters, such as availability of on demand movies, 3D content, commercial free media, etc. The media guidance application may filter the content providers, such that content providers not matching content provider parameters requested by the user may be excluded from the matching.

In some embodiments, the media guidance application may prompt a user for parameters related to a desired subscription. For example, the media guidance application may prompt a user for a monthly budget dedicated to content subscriptions. The media guidance may determine, based on a user profile associated with the user, a number of media assets that will likely be of interest to the user based on the budget. For example, the media guidance application may receive a budget of $30 per month from the user via an input device, such as a remote control. The media guidance application may identify all possible combinations of content providers that will remain at or under the $30 budget by, for example, querying a database of costs associated with content providers, summing the cost of a combination of content providers, and comparing the cost to the budget, while maintaining a total overall value for the subscriptions (as described below). The media guidance application may generate for display a listing of the combinations of content providers fitting the budget.

In some embodiments, the media guidance application may determine a value corresponding to a content provider based on a subscription setting. For example, the media guidance application may determine that the user consumes media assets on a television 70% of the time as described above. The media guidance application may further determine that all media assets of interest to the user (e.g., 10 media assets) are available on content providers such as HBO and HBO GO. The media guidance application may determine a value for each respective content provider by, for example, summing the number of media assets of interest to the user that are available on television weighted by 0.7 and the number of media assets of interest to the user available in other formats weighted by 0.3 corresponding to a respective content provider. The media guidance application may recommend a content provider having a greater value to the user. For example, the media guidance application may determine that 10 media assets of interest to the user are respectively available from HBO and HBO GO. The media guidance application may multiply 10 (the number of media assets of interest to the user available on a television from HBO) with 0.7 (the weight for media assets available on a television) to compute a value of 7 for HBO. The media guidance application may multiply 10 (the number of media assets available for streaming from HBO GO) with 0.3 (the weight for media assets available for streaming) to compute a value of 3. The media guidance application may compare the two values and may recommend or may automatically subscribe to a HBO subscription since the value of the HBO subscription is greater than the value of the HBO GO subscription (7 v. 3). This is just an exemplary subscription setting that may be used to calculate a subscription value, one of ordinary skill would realize that other subscription settings may be used such as quality of a media asset (e.g., based on resolution, bitrate, etc.), language availability, availability of subtitles, possible viewing locations (e.g., in home v. out of home availability), media aspect ratio, media asset genre availability, availability of a specific media asset etc.

In some embodiments, other factors may be used to calculate the value, such as a priority of a media asset or availability of other recommended media assets from a content provider. For example, the media guidance application may apply a specific weighting to a media asset deemed to have a higher priority than a media asset deemed to have a lower priority. Furthermore, the media guidance application may apply additional weighting to the value if other media assets (e.g., recommended media assets not explicitly identified by the user are available from the content provider). For example, the media guidance application may add a fixed value, such as 0.5 to the number of media assets used to calculate the value (as described above). In another example, the media guidance application may scale the value based on a strength of the recommendation. For example, the media guidance application may determine that the television show "True Blood" matches the television show "Game of Thrones" by 80% (e.g., by comparing metadata associated with the show "Game of Thrones" with metadata associated with the show "True Blood" to determine that 85% of the metadata (such as genre, theme, etc.) matches that of "Game of Thrones". Accordingly, the media guidance application may scale the value (0.5) by 0.8 (a decimal representation of the percent "Game of Thrones" matches "True Blood") and may use the scaled value (0.4) for in calculating the value as described above.

In some embodiments, the media guidance application may determine a value cost based on a cost of a subscription. For example, the media guidance application may query a respective content provider for a respective cost associated with a subscription. For example, the media guidance application may receive a cost of $9 per month corresponding to HBO GO and a cost of $28 per month corresponding to a subscription of HBO. The media guidance application may divide the respective cost of a subscription to a content provider with a respective value of a subscription to a content provider to compute a value cost for the content provider, wherein the value cost represents a required subscription cost associated with each unit of value (as computed above) for the content subscription. For example, the media guidance application determines an overall value for HBO by dividing the respective subscription cost ($28) with the respective value (as computed above) (7 units of value) to derive a value cost of $4 per unit of value. The media guidance application may determine an overall value for HBO GO by dividing the respective cost ($9) with the respective value computed above (3 units of value) to compute a value cost of $3 per unit of value. In this instance, the media guidance application may recommend a subscription to HBO GO since the dollar cost per unit of value ($3 per unit of value) corresponding to HBO Go is less than the dollar cost per unit of value corresponding to HBO. However, this is just an exemplary method for calculating a value cost. One of ordinary skill in the art will realize that other methods for calculating value may be used. For example, the media guidance application may use other cost optimization methods to identify a subscription having the highest value for the user.

In some embodiments, the media guidance application may compare the media asset with a database listing media assets that will become available from the content provider to identify a date on which the media asset will become available from the content provider. For example, the media guidance application may access a schedule of media assets that will be available from a content provider in the future. For example, the media guidance application may access a programming schedule corresponding to the channel HBO. The media guidance application may search the programming schedule for the television show "Game of Thrones." The media guidance application may identify an air date corresponding to an episode of the show "Game of Thrones" on the channel HBO. In another example, the media guidance application may identify a date on which the media asset of interest to a user is available on demand or through streaming. For example, the media guidance application may identify a date corresponding to the day on which the television show "Game of Thrones" becomes available for streaming.

In some embodiments, the media guidance application may compare the date in a database listing date ranges associated with different subscription periods to identify the date. For example, the media guidance application may access a listing of date ranges for all currently available subscription periods. For example, the media guidance application may determine that HBO offers monthly and yearly subscriptions. The media guidance application may access a database containing start and end dates for both the monthly and the yearly subscriptions starting at various start dates. The media guidance application may identify a subscription period that includes the date when the television show "Game of Thrones" becomes available.

In some embodiments, the media guidance application may calculate the start and end dates corresponding to a subscription period. For example, the media guidance application may access a listing of subscription periods offered by a content provider. For example, the media guidance application may receive a listing of subscription periods offered by a content provider (e.g., a month, three months, a year, etc.). Additionally, in an example, the media guidance application may receive a listing of start dates for a subscription. For example, the media guidance application may receive a start date (e.g., the first of the month, the second Monday of the month, any date, etc.) for a subscription to become active. The media guidance application calculates a subscription period such that it includes the date that the media asset of interest to the user is available. For example, the media guidance application may determine that the show "Game of Thrones" becomes available on HBO in 15 days. The media guidance application may identify a monthly subscription period, staring today, as the subscription period, as the 30-day subscription period would include the date (i.e., the date on which "Game of Thrones" begins) 15 days away.

In some embodiments, the media guidance application may determine the start date based on a subscription budget. For example, the media guidance application may retrieve a subscription cost associated with the content provider as $15 per month. The media guidance application may receive a monthly budget to allocate towards media content subscriptions, such as a budget of $30 a month, from the user profile data. The media guidance application may calculate the start by determining a date when the there is enough budget to subscribe to the content provider. For example, the media guidance application may determine that there are currently $28 worth of active subscriptions by, for example, querying a database comprising a listing of subscriptions corresponding to the user and retrieving the costs associated with the active subscriptions. The media guidance application may query the database to identify an end date associated with a media content subscription (as described below) as well as an associated cost. The media guidance application may identify, based on the query, that a $20 per month subscription will end on Friday. The media guidance application may identify Saturday as a start date for the subscription to the content provider since Saturday is the first day where there is enough budget for the subscription to the content provider.

In some embodiments, the media guidance application may compare a value associated with the active subscriptions with the value. For example the media guidance application may retrieve or may calculate a value (as described above) for each of the active subscriptions for the user. The media guidance application may iteratively compare the value with a value associated with each active subscription to determine if the value is greater than a value of an active subscription. If the value is greater than the value of an active subscription, the media guidance application may request a cancellation of the active subscription having a lower value than the value in order to replace the active subscription with a subscription to the content provider. For example, following from the previous example, the media guidance application may determine a value of 7 for a subscription to HBO. The media guidance application may identify that the user has an active subscription to Netflix and may identify the value of the Netflix subscription to the user as 5. The media guidance application may request cancellation of the Netflix subscription and may subsequently request activation of a subscription to HBO.

In some embodiments, the media guidance application may compare the value of an active subscription with the value if adding a subscription to the content provider will surpass the budget. For example, the media guidance application may identify a monthly budget of $30 as described above. The media guidance application may sum the cost associated with the active subscriptions to identify $28 worth of active subscriptions. The media guidance application may compare the value of the active subscriptions with the value of a subscription to the content provider if the cost of adding a subscription to the content provider (e.g., $30 in addition to the $28 of active subscriptions) would surpass the budget (e.g., $30). The media guidance application may automatically cancel an active subscription having a lower value a subscription to the content provider in order to add a subscription to the content provider.

In some embodiments, the media guidance application may determine the subscription period based on the date that the last of a plurality of media assets will become available. For example, the media guidance application may determine that a plurality of episodes of the show "Game of Thrones" are of interest to a user. The media guidance application may identify a date that each of the episodes of the show is first available. The media guidance application may determine a subscription period such that the subscription period includes the latest available media asset of interest to the user. For example, the media guidance application may determine that the television show "Game of Thrones" has 10 episodes that will become available once weekly beginning in February and ending in April. The media guidance application may select a quarterly subscription period as the period may comprise the start dates of all 10 episodes (i.e., 10 weeks) of the show "Game of Thrones."

In some embodiments, the media guidance application may determine the number of media assets that are of interest to a user that become available from the content provider during the subscription period. For example, the media guidance application may determine the number of episodes of the television show "Game of Thrones" that are available during various subscription periods. For example, the media guidance application may determine that four episodes of "Game of Thrones" become available to a user over a subscription period of a month, ten episodes become available over the subscription period of three months and, likewise, 10 episodes become available over the subscription period of a year. As an example, the media guidance application may select the three month period as the media guidance application calculated diminishing marginal returns on the longer subscription periods (i.e., the amount of additional media assets of interest to the user (marginal return) decreases with increasing subscription period).

In some embodiments, the media guidance application may compare the number of media assets of interest to a user that become available from the content provider during the subscription period to a threshold number. For example, the media guidance application may access a threshold value from a memory indicating a minimum number of media assets requested during a subscription period. For example, the media guidance application may receive a number of media assets requested by a user, such as 10 movies, from a memory associated with the media guidance application, in a user profile associated with the user. The threshold number may be input by a user to the database or may be pre-assigned upon creation of the user profile.

In another example, the threshold number may be computed based on user viewing characteristics. For example, the media guidance application may determine the threshold number by calculating an average number of media assets consumed by a user over a subscription period. For example, the media guidance application may determine that a user consumes on average three media assets a day. The media guidance application may determine a threshold for a month long subscription period to be 90 media assets (i.e., three media assets times 30 days). The media guidance application may search for content providers that may have in a media library a minimum of 90 media assets of interest to the user over the subscription period.

In another example, the media guidance application may calculate the threshold by factoring in other subscriptions. For example, in the example where the user consumes on average ninety media assets per month, the media guidance application may factor in a current user subscription to a content provider wherein the user consumes twenty media assets per month. Therefore, the media guidance application may calculate the threshold number to be seventy media assets (i.e., 90 media assets per month minus the 20 media assets per month already consumed by the user on another current subscription). The media guidance application may search for a content provider that may have 70 media assets of interest to the user available during the subscription period.

In some embodiments, the media guidance application may, based on a number exceeding the threshold number, select the subscription period. For example, the media guidance application may select a subscription period such that a threshold minimum number of media assets of interest to the user are available throughout the subscription period. In an example, the media guidance application may determine that the number of media assets of interest to a user during the subscription period exceeds an average number of media assets consumed by the user during the subscription period (e.g., a user usually consumes thirty media assets per month but there are 50 media assets of interest to the user in the monthly subscription). The media guidance application may automatically extend the subscription period such that the user may consume all media assets that are of interest. Following from the previous example, the media guidance application may extend the subscription period to two months so that all 50 media assets of interest to the user may be consumed by the user.

In some embodiments, the media guidance application may determine a start date for the subscription. For example, as described above, the media guidance application may retrieve start dates (e.g., beginning of the month, beginning of the year, anytime) associated with media subscriptions to the content provider. For example, the media guidance application may identify that HBO allows users to subscribe at any time of the month. The media guidance application may identify today as the start date for a monthly subscription period if the media guidance application calculates that the start date of the media asset of interest to the user is less than a month away.

In some embodiments, the media guidance application may suggest delaying the subscription. For example, the media guidance application may determine that a media asset of interest to the user will become available in 45 days. The media guidance application may determine the start date of a monthly subscription to be at least 15 days away such that the subscription period (e.g., 30 days) comprises the date the media asset of interest to the user becomes available.

In some embodiments, the media guidance application may generate for display an option to modify the recommended subscription. For example, the media guidance application may generate for display a user option to increase or decrease the length of a recommended subscription period. In another embodiment, the media guidance application may generate for display a user option to modify the start date of a subscription. For example, in some instances the media guidance application may recommend a one-month subscription for Netflix to a user. The media guidance application may generate for display an option allowing the user to increase or decrease the length of the subscription or to change the start date of the subscription. The media guidance application may detect the modified parameters of the subscription at an input device accessible to the media guidance application (e.g., such as recognizing touch input on a touchscreen, or receiving an Ethernet packet containing the modified parameters). In accordance with the detected parameters, the media guidance application may modify the subscription. These are just exemplary embodiments of tweaking a subscription; other options may be presented to the user to modify the recommended subscription.

In some embodiments, the media guidance application may generate for display, on a display screen, a reminder to the user to request access to the content provider on the start date. For example, the media guidance application may generate for display on a display screen accessible via the media guidance application a message informing the user to request access or subscribe to the content provider on the start date. In another example, the media guidance application may display a reminder to the user before the start date.

In some embodiments, the media guidance application may generate for display an option to subscribe to the content provider with the reminder message. For example, the media guidance application may generate for display an icon within the reminder to automatically subscribe the user to the content provider on the determined start date for the determined subscription period. For example, the media guidance application may recommend to a user a one-month subscription to the channel HBO. The media guidance application may generate for display an icon that a user may click (e.g., using a mouse, a touch screen, remote control, etc.) to sign up for the HBO subscription. The media guidance application may detect the user input indicating a click of the icon and may process the request to sign-up to a media provider. In another example, the media guidance application may display a hyperlink to a website configured to process a subscription request. For example, the media guidance application may generate for display a link to a website, such as a link to a Hulu sign-up page, where a user may complete a subscription sign-up process.

In some embodiments, the media guidance application may request access to the content provider on the start date. For example, the media guidance application may transmit a packet to the to a content provider requesting access to the content provider on the start date without requiring user input. In another example, the media guidance application may request access to the content provider on the start date in response to receiving input from a user instructing the media guidance application to request access on the start date. For example, the media guidance application may receive user input indicating a request to subscribe to the content provider in response to generating the reminder.

In some embodiments, the media guidance application may generate for display the date at which the media asset becomes available from the content provider with the reminder. For example, the media guidance application may display a date (e.g., a date which a media asset that is of interest to the user becomes available) such that the user is notified of the date. In an example, the media guidance application may display a pop-up message with the date along with a reminder.

In some embodiments, the media guidance application may automatically request a subscription to a content provider (as described above) such that the media guidance application will have access to the media content of interest to the user on the start date. For example, the media guidance application may transmit a query to the content provider requesting a new account. The media guidance application may automatically create an account for the user using the name and contact information for the user (e.g., as retrieved by the media guidance application from the user profile) or may create a new generic account (e.g., an account registered to the media guidance application or similar).

In some embodiments, the media guidance application may generate for display a recommendation for an additional media asset that is similar to the media asset and available from the content provider before the date. For example, the media guidance application may access a listing of media assets that that are currently available from the media provider. The media guidance application may identify media assets that are similar to the media asset of interest to the user by, for example, comparing metadata of the media asset of interest to metadata of the media assets that are currently available from the media provider. As another example, the media guidance application may retrieve a listing of media assets that will become available from the content provider between the current date and the date that the content of interest to the user becomes available. The media guidance application may receive, from a user profile, a listing of media assets of interest to the user, such as a list of favorite programs. The media guidance application may search the list of media assets that will become available for media assets from the list of favorite programs.

In some embodiments, the media guidance application may generate for display a reminder, including a recommendation for an additional media asset that is currently available from the provider. For example, the media guidance application may search a schedule or listing of VOD programs for a media asset to recommend to a user. For example, the media guidance application may retrieve metadata corresponding to the media asset of interest to the user such as a genre, a list of performers, etc. The media guidance application may search a schedule of VOD program listings corresponding to the content provider for assets matching the portion of the retrieved metadata. When a match is found, the media guidance application may recommend the media asset to the user.

In some embodiments, the media guidance application may generate for display on a display screen accessible to the media guidance application a reminder on the start date. For example, the media guidance application may generate for display a pop-up notification on a display screen accessible to the media guidance application containing a reminder to the user to subscribe to the content provider on the start date. In another example, the media guidance application may generate for display on a display screen accessible to the media guidance application a window requiring user action to dismiss the reminder on the start date of the program of interest to the user.

In some embodiments, the media guidance application may generate for display on a display screen accessible to the media guidance application a reminder before the start date. For example, the media guidance application may generate for display a pop-up message on a display screen associated with the media guidance application informing a user to subscribe to the content provider. In another example, the media guidance application may generate a text message containing a reminder to subscribe to the content provider and send said text message before the start date. In another example, the media guidance application may generate an email reminder to the user to subscribe to the content provider. The media guidance application may transmit the email reminder prior to the start date.

In some embodiments, the media guidance application may determine the number of days between the date the media of interest to the user becomes available and the start date. For example, the media guidance application may compute a start date, as described above, and may determine a date on which the media of interest to the user becomes available. The media guidance application may subtract the start date from the date the media of interest to the user becomes available to determine a number of days between the two dates.

In some embodiments, the media guidance application may generate for display, on a display screen, media asset recommendations based on the number of days. For example, the media guidance application may modify the number of recommendations provided to the user based on the number of days. In an example, the media guidance application may access a user profile to determine the number of media assets consumed by a user by, for example, accessing a field indicating the total number of media assets consumed by a user in the past month. The media guidance application may estimate the number of media assets consumed by the user per day by, for example, dividing the number of media assets retrieved from the profile by the number of days in a month. In an example, the media guidance application may determine that a user has consumed 15 media assets in the past month. The media guidance application may divide 15 by 30 days in the month to determine that the user watched on average 0.5 media assets per day. Based on the estimated number of media assets consumed by the user per day, the media guidance application may provide a proportional number of recommendations. For example, the media guidance application may recommend media assets on a one-to-one ratio.

Following from the previous example, if it is determined that there are 10 days between the start date and the date that the media asset of interest to the user becomes available, the media guidance application may recommend five media assets to the user. In another example, the media guidance application may provide a number of media asset recommendations based on a ratio of the number of days. For example, the media guidance application may automatically display a recommendation for each day of the days. Following from the previous example, if it is determined that the number of days is 10, the media guidance application may recommend 10 media assets to the user. In another example, the media guidance application may prompt the user for a number of recommendations based on the number of days. For example, the media guidance application may inform the user that the number of days is 10. The media guidance application may prompt the user to input a number of recommendations desired by the user over the course of the 10 days.

In some embodiments, the media guidance application may prompt the user for a ratio used to determine the number of media assets to be recommended. For example, the media guidance application may generate for display on a display screen accessible to the media guidance application a prompt with the number of days (e.g., 10). The media guidance application may prompt the user to input how many recommendations they want per day (e.g., 0.5, 1, 2). Based on the number input by the user, the media guidance application may recommend a number of media assets.

In some embodiments, the media guidance application may determine a day of the week between the date and the start date. For example, the media guidance application may determine a day of the week associated with the start date and a day of the week associated with the day the media asset of interest to the user becomes available. The media guidance application may determine a day of the week by randomly selecting a day of the week between the two days. In another example, the media guidance application may identify a day of the week by accessing a user profile associated with a user.

The media guidance application may identify a day of the week in which a user most frequently consumes media assets. The media guidance application may select that day of the week. In the event that the day of the week the user consumes the most media assets is not within the two days (e.g., the user consumes the most media assets on Friday but only Tuesday and Wednesday are between the date and the start date), the media guidance application may select the day of the week on which the user consumes the second most media assets. This process may continue until day of the week is selected.

In some embodiments, the media guidance application may determine the day of the week based on the availability of content from a content provider. For example, the media guidance application may select a day of the week that has the most content available to the user matching a user profile characteristic. For example, the media guidance application may retrieve from a user profile data indicating a user preference for horror movies. The media guidance application may access a database containing metadata related to the media assets offered by a content provider corresponding to each day of the week. The media guidance application may search the database for media assets matching the horror genre to identify a day of the week (e.g., Friday) having the most horror movies available to the user. The media guidance application may select the day of the week (e.g., Friday) to provide a recommendation to a user.

In some embodiments, the media guidance application may generate for display, on a display screen, a recommendation for an additional media asset based on the day of the week. For example, the media guidance application may select Friday as the day of the week as described above. The media guidance application may compare metadata corresponding to the media asset of interest to the user with media assets corresponding to the day of the week, by, for example, accessing a database corresponding to a schedule of media assets available on the day of the week. For example, the media guidance application may identify "Austin Powers: International Man of Mystery" staring Mike Myers as a media asset of interest to the user. The media guidance application may search a schedule or VOD program listing of media assets available on Friday for other media assets starring Mike Myers. The media guidance application may identify "Wayne's World" (also starring Mike Myers) as available to the user on Friday. The media guidance application may generate for display on a display screen accessible to the media guidance application a recommendation for the media asset "Wayne's World."

In some embodiments, the media guidance application may determine if the user is currently subscribed to the content provider. For example, the media guidance application may retrieve user profile data indicating whether a user has had a subscription to a content provider and whether the subscription is current. As another example, the media guidance application may query a server or computer, such as a server corresponding to the content provider, to request a status of a user's subscription.

For example, the media guidance application may generate a query with a field containing a number uniquely identifying a user or user account and a request to retrieve a status for the account. The media guidance application may transmit the query over a network connection accessible to the media guidance application. In another example, the media guidance application may transmit a query to a database containing the subscription status for a plurality of subscriptions corresponding to a user. The media guidance application may generate a query to the database to request a status of the subscription corresponding to the content provider. In an example, if a user is not currently subscribed to a provider, a user may receive a NULL response from the server.

In some embodiments, the media guidance application may determine an end date of a current subscription period of the user. For example, the media guidance application may store, in a database of user subscription information, information about the subscription period and a start date of a subscription. The media guidance database may calculate the end date of the current subscription by adding the start date of the subscription with the subscription period. In another example, the media guidance application may query a remote server for the end date of the subscription. For example, the media guidance application may generate a query containing an identifier uniquely identifying a user or a user account along with a request for an end date of a current subscription.

In some embodiments, the media guidance application may generate for display, on a display screen, the reminder to the user to request access to the content provider on the end date. For example, the media guidance application may determine that a user subscription to a content provider may end on Friday. The media guidance application may display a reminder to the user, on or before Friday, to request access to the content provider on the end date (e.g., Friday).

In some embodiments, the media guidance application may remind a user to not request access to the content provider on the end date. For example, the media guidance application may detect a change in user preferences which may alter the content providers recommended by the media guidance application. For example, the media guidance application may detect a change in a user profile data, such as detecting a change in a list of favorite media assets, indicating that media assets from a content provider are no longer a user favorite. The media guidance application may recommend to a user to not request access from a content provider on the end date. In another example, the media guidance application may display a reminder to the user to cancel access to a content provider before the end of a current subscription period. For example, the media guidance application may generate for display, on a display screen, a reminder to the user to cancel access to a content provider based on a change in a user preference.

In some embodiments, the media guidance application may manage user access requests to each of the content providers. For example, the media guidance application may control requests for access to a media library from a content provider. For example, a user may use an input device, such as a touch screen of a tablet device, accessible to the media guidance application. The media guidance application may receive user input to subscribe to a specific content provider, such as HBO. The media guidance application may, without further user input, relay contact information about a user, a subscription period, a start date, etc. to the contact provider (HBO) to establish an account and/or begin payment for access to the content library.

In some embodiments, the media guidance application may automatically manage access to multiple content providers. For example, the media guidance application may automatically determine start and end dates for access to content provided by content providers. The media guidance application may communicate, without requiring user input, with servers corresponding to the content providers to manage user access to a media library of a content provider. For example, the media guidance application may automatically sign up a user for an HBO subscription, when recommended (as described above) by the media guidance application, and may cancel the HBO subscription when recommended (e.g., determine the subscription period, as described above) by the media guidance application.

In some embodiments, the media guidance application may actively manage subscriptions to maintain a threshold average overall value for all subscriptions. For example, the media guidance application may determine that the user is willing to spend $2 per month per high priority media assets of interest to the user available in that month. The media guidance application may identify all the high priority media assets available to a user in a given month and may adjust the budget accordingly (e.g., adjust the budget to be the number of available high priority media assets times $2). The media guidance application may automatically sign up for or recommend media content subscriptions to the user if a total cost of the subscriptions is not greater than the budget. In another example, the media guidance application may manage subscriptions on a fixed budget. For example, the media guidance application may identify a fixed $30 budget per month as describe above. The media guidance application may maximize a value of the subscriptions for the user by, for example, prioritizing subscriptions for high priority media assets of interest to the user or by identifying subscriptions to content providers having the best value cost as described above (e.g., lowest per dollar cost per unit of value).

In some embodiments, the media guidance application may prompt a user to select a subscription from a list of content providers. For example, the media guidance application may display a listing of content providers and subscriptions to which the user does not have access (e.g., by querying content providers as to whether a user account exists for the user). The media guidance application may receive user input selecting one or more content providers to which the user wants access. The media guidance application may automatically establish an account for the user for a selected content provider as described above.

In some embodiments, the media guidance application may prompt a user to cancel a subscription to a content provider. For example, media guidance application may determine that a user has not consumed media from a content provider in a threshold number of days (e.g., a threshold number of days chosen by a user, stored in the user account). The media guidance application may display a listing of all content providers to which the user has access, (e.g., by accessing a user profile containing data identifying providers to which the user has access). The media guidance application may receive user input containing a cancellation request for a subscription to a content provider. The media guidance application may automatically cancel a user account associated with the content provider as described above.

In some embodiments, the media guidance application may recommend various levels of subscriptions based on the user's historical viewing habits. For example, the media guidance application may retrieve, from the user profile, a history of services, channels, apps, etc., frequently accessed by the user. The media guidance application may recommend a number of services based on the history. For example, the media guidance application may determine that the user frequently uses an HBO Go app, a Netflix app and a DirecTV app for streaming media. Based on the history, the media guidance application may recommend to the user that the user subscribes to HBO Go, Netflix and DirecTV, and may provide the user with a price quote for subscriptions for the three content providers.

In some embodiments, the media guidance application may aggregate a number of content providers into a package. For example, the media guidance application may determine, based on the user profile (e.g., by determining that a threshold percentage of media assets consumed by the user are movies), that a user is a frequent movie watcher. The media guidance application may recommend a pre-configured movie package, such as a package containing all content providers offering movies, to the user.

In some embodiments, the media guidance application may establish discounts with the content providers included in the package and may forward all or a portion of the discount onto the subscriber, such that the cost of the aggregated movie content providers is less than subscriptions to each of the movie content providers separately.

In some embodiments, the media guidance application may recommend multiple packages to a user. For example, the media guidance application may determine that a user frequently watches movies and sports programs, based on the user profile (e.g., by accessing preference data input by a user). The media guidance application may recommend a movie and sports package to the user, which includes subscriptions to all content providers offering sports and movie media. The media guidance application may generate a single bill for both media packages.

In some embodiments, the media guidance application may estimate a number of media assets expected to be of interest to the user for a combination of content providers. For example, the media guidance application may enumerate the number of media assets expected to be of interest to the user by, for example, accessing user profile data indicating media preferences of the user and enumerating the number of media assets matching the preference that are scheduled to be available from the combination of content providers. The media guidance application may sort the list of combinations based on an expected number of media assets that are of interest to the user for each respective combination. In another example, the media guidance application may display a number of media assets expected to be of interest to the user for each content provider of the combination. For example, the media guidance application may identify a combination of HBO and Cinemax and may display a number of media assets expected to be of interest to a user from HBO and a number of media assets expected to be of interest to the user from Cinemax.

In some embodiments, the media guidance application may manage billing for multiple content providers. For example, the media guidance application may receive access charges from all content providers currently accessible to the user. For example, the media guidance application may receive bills related to an HBO, Netflix, and Hulu account. The media guidance application may generate a single bill to the user (e.g., a single monthly bill containing the charges from all content providers). In some examples, the media guidance application may charge an additional service fee in addition to the fees charged by the content providers. In some embodiments, the bills generated by the content providers may be accessible to the user (e.g., via an account portal or website associated with the media guidance application). In some embodiments, the media guidance application may not make the user aware of subscriptions to content providers made in the user's name. In some embodiments, the media guidance application may allow a user to manage subscriptions to various content providers directly in an interface provided by the media guidance application (e.g., via an account portal or website associated with the media guidance application). In some embodiments, the media guidance application enables a user to download and view a bill associated with a content provider. For example, the media guidance application may provide webpage from which the user may download a bill corresponding to a specific content provider.

In some embodiments, the media guidance application may automatically bill customers for charges from multiple content providers. For example, the media guidance application may automatically draw funds from an account associated with a user when a bill becomes due. As an example, the media guidance application may access a profile associated with a user having payment information, such as bank account or credit card information. The media guidance application may receive bills from various content providers (e.g., at the beginning of a billing period) and may automatically pay the bills as they become due from a funding source associated with the user (e.g., a bank account linked to the user profile).

In some embodiments, the media guidance application may request payment from a user. For example, the media guidance application may display a prompt on a display screen associated with the media guidance application requesting payment of a bill associated with one or more content providers. Upon receipt of user input authorizing a payment, the media guidance application may allocate funds to the appropriate content providers. For example, the media guidance application may pay the bill for each content provider as the bill is authorized by the user.

In some embodiments, the media guidance application may offer discounts for subscribing to multiple content providers. For example, the media guidance application may offer users a discount for subscribing to both HBO and Cinemax (a sister channel of HBO). The discount may be provided through a sponsorship from the content providers. As an example, both Cinemax and HBO may offer users a discount when the two content providers are subscribed to simultaneously. The media guidance application may rank or recommend content providers based on a relative sponsorship. For example, if the savings associated with a HBO and Cinemax subscription are greater than the savings associated with an HBO and Showtime subscription, the media guidance application may recommend a HBO and Cinemax subscription.

In some embodiments, the media guidance application may recommend additional hardware to a user based on user profile data. For example, the media guidance application may determine that a user prefers to watch movies that are available on either the combination of HBO and Cinemax or on Netflix. However, the user may only have access to hardware capable of accessing HBO and Cinemax. The media guidance application may recommend for a user purchase of a streaming capable device, such as an Amazon Fire TV or a Roku, so that the user may benefit from a possibly lower subscription cost of Netflix over the combination of HBO and Cinemax.

In some embodiments, the media guidance application may aggregate content from providers to which a user has access in a single interface. For example, the media guidance application may determine that a user has access to content providers such as HBO, Cinemax and Hulu. The media guidance application may generate an icon, a list element, etc., that links to media assets associated with HBO, an icon, a list element, etc., that links to media assets associated with Cinemax, and an icon, a list element, etc., that links to media assets associated with Hulu in a single interface. In some embodiments, selection of an icon associated with Cinemax will provide a list of media assets associated with Cinemax (e.g., without exiting the media guidance application or launching a Cinemax application). In some embodiments, the media guidance application may launch a separate application associated with each content provider. For example, selection of an icon associated with Cinemax may launch a Cinemax application. In another example, selection of an icon associated with Cinemax may begin playback of a media asset associated with Cinemax from a Cinemax application.

In some embodiments, the media guidance application may aggregate all content to which a user has access. For example, the media guidance application may aggregate all content in a single interface. For example, the media guidance application may list all media assets available to a user (i.e., regardless of the content provider) in an alphabetical list, a listing by genre, by director, etc. In some embodiments, the media guidance application may generate for display an identifier corresponding to the content provider. For example, the media guidance application may generate for display text or a graphic identifying the content provider. For example, the media guidance application may generate, on a listing associated with a media asset, a logo, such as an HBO logo, on a media asset where HBO is the content provider.

In another example, the media guidance application may, as perceived by the user, disassociate content with a provider. For example, the media guidance application may eliminate identifiers that associate a media asset with a specific content provider.

In another example, the media guidance application may enable a searching function that performs a search of all media assets accessible to a user (i.e., regardless of content provider). In some embodiments, the media guidance application may identify a media asset to which the user currently does not have access but will have access at a later date. The media guidance application may generate for display the media asset in search results.

In some embodiments, the media guidance application may negotiate and manage subscriptions between a user and a content provider. For example, the media guidance application may analyze user profile data to identify a user profile characteristic that is of interest to a content provider (e.g., demographic data, how frequently a user views commercials, etc.). Based on the identified profile characteristic, the media guidance application may determine how closely the user matches a profile characteristic of interest to the content provider. The media guidance application may negotiate subscription terms with the content provider in order to optimize the subscription value for both the content provider and the user (i.e., by lowering the subscription cost to the user and by incentivizing the user the subscribe to the content provider.

In some embodiments, the media guidance application may retrieve a user profile from memory as described above. In some embodiments, the user profile is retrieved from memory in response to detecting that a user is going to cancel a subscription to a content provider. For example, the media guidance application may detect a user request to end a subscription to a content provider. The media guidance application may search a database of media assets available from a plurality of content providers to identify a plurality of media assets matching a user preference in the user profile. For example, the media guidance application may enumerate genres of media assets viewed by a user (e.g., as noted in a viewing history of the user profile). The media guidance application may identify horror movies as a most frequently viewed genre for the user. The media guidance application may search for all media assets accessible to the user for media assets matching the horror genre.

In some embodiments, the media guidance application may search media assets not yet accessible to a user (e.g., media assets for which a user does not have a subscription). For example, the media guidance application may search a database of media assets corresponding to a content provider to which a user does not have a subscription for media assets matching the horror genre.

In some embodiments, the media guidance application may identify a first subset of the plurality of media assets available from a first content provider of the plurality of content providers, wherein the user requires a first subscription to the first content provider to access the first subset. For example, the media guidance application may identify a first subset of media assets, such as the subset of media assets available from the first content provider. The media guidance application may select a first content provider by, for example, enumerating a number of media assets matching the horror genre for each content provider and may select a content provider having the most media assets matching the horror genre. The media guidance application may identify a content provider to which a subscription is required. For example, the first content provider may require a monthly subscription payment in exchange for access to media content. In some embodiments, the media guidance application may pay a minimal (e.g., $0) subscription cost to browse a library of media assets but may need to pay a fee to access a particular media asset. For example, the media guidance application may pay the content provider a $0.99 subscription cost to view and browse a media library provided by the content provider. For each media asset accessed by the media guidance application, the content provider may charge an additional $0.50 fee. In some embodiments, the media guidance application may detect multiple subscription options corresponding to a content provider. For example, the media guidance application may detect a subscription whose terms allow unlimited access to media assets for $20 per month, or, in another example, a subscription whose terms allow streaming five media assets per month for $2.

In some embodiments, the media guidance application may retrieve first user profile characteristics of interest to the first content provider. For example, the media guidance application may retrieve characteristics such as demographic data, viewing history, price preferences, rate of media consumption, preferences for commercials, and retail purchase information. The media guidance application may use this information to, for example, match a user that a content provider would be most interested in acquiring, based on the user profile characteristics, to an appropriate subscription for that user, based on user likes and interests or other profile data.

In some embodiments, the media guidance application may infer user profile characteristics that may be of interest to a provider. For example, the media guidance application may search the media assets available from a content provider and may determine that the content provider only offers media assets having commercials. The media guidance application may identify that a user profile characteristic of interest to the content provider may be a user who watches commercials. In another example, the media guidance application may query a content provider for features and capabilities of the content provider. For example, the media guidance application may inquire whether a content provider has media assets having surround sound audio or closed captions. The media guidance application may determine that a content provider having surround sound capabilities may be more interested in acquiring users who most frequently consume media on a television (e.g., as opposed to a laptop or tablet). In another example, the media guidance application may detect that a content provider does not have closed caption capabilities. The media guidance application may determine that a user profile characteristic of interest to the content provider may be that a user profile does not indicate a hearing impairment.

In some embodiments, the media guidance application may compare the first user profile characteristics to the user profile. For example, the media guidance application may identify a first user characteristic, such as a characteristic that a user watches advertisements before videos at least a threshold percentage of time. The media guidance application may compare the user profile characteristic to the user profile by identifying a percentage of time a user watched an advertisement that was presented to the user. The media guidance application may compare the identified percentage to the threshold to determine whether the identified percentage is above the threshold (i.e., the user profile matches the user profile characteristic). The media guidance application may retrieve the threshold from memory or may query the content provider for the threshold (e.g., via a packet transmitted over a communication network). As another example, the media guidance application may detect that a user profile characteristic of interest to the user is that the user understands English (e.g., the media guidance application may detect that all media assets available from a content provider are only available in English). The media guidance application may search the profile of a user for data identifying languages understood by the user. In some instances, the media guidance application may detect that a user has not indicated a language in his or her user profile. The media guidance application may analyze a history of media assets consumed by the user to identify a language associated with each media asset in the history. The media guidance application may enumerate the number of media assets matching a particular language and, based on the enumeration, identify a language most frequently consumed by the user. The media guidance application may perform a similar comparison for each user profile characteristic of interest to the content provider.

In some embodiments, the media guidance application may normalize the user profile characteristics to come up with a range. For example, the media guidance application may evaluate a user profile characteristic for all users of the system, such as an income, and may normalize the income for all users. Based on the data collected from all the users (e.g., all incomes), the media guidance application may create a normalization function, such that by applying the normalizing function to a distribution of all income values for all users the distribution will be normal. The media guidance application may use normalized income to determine a range of incomes of interest to the content provider, by, for example, using the incomes within one standard deviation from the mean income as the range.

In some embodiments, based on comparing the first user profile characteristics to the user profile, the media guidance application may determine a degree to which the first user profile characteristics correspond to the user profile. In an example, the media guidance application may identify a content provider that generates revenue by solely advertising local concerts. The media guidance application may identify user profile characteristics of users who like local concerts by automatically analyzing data corresponding to a global user database to identify a target demographic of users who would most likely watch and/or purchase the advertised local concert tickets. For example, the media guidance application may access a local or remote database comprising information related to all users who watch advertisements. Accessing on the database information, the media guidance application may identify all users who proceeded to watch an advertisement for a local concert or purchase advertised local concert tickets. In an example, the media guidance application may identify a target demographic age by, for example, retrieving the age of all users who watched a local concert advertisement or purchased advertised local concert tickets, summing the ages and dividing by a number of users. In an example, the media guidance application may identify the target demographic as comprising user profile characteristics such as an age or age range (e.g., 40 or 40-50 years old), gender (e.g., male), income (e.g., between $1,000 and $1,500 per week), and geographic location (e.g., close proximity to a concert stadium). The media guidance application may identify the user profile characteristics of the target as being of interest to the content provider.

In some embodiments, the media guidance application may determine a degree to which the first user profile characteristics correspond to the user profile by comparing each profile characteristic to the corresponding user profile data, and, based on the comparison, assigning a score to the comparison. The media guidance application may use the score as a degree by which a specific profile characteristic corresponds to the user profile.

In an example, the media guidance application may retrieve user profile data indicating that the user is a 55 year old female living in Secaucus, N.J., who earns $1,250 per week. The media guidance application may first compare the user's age (e.g., 55 years old) to the age of interest to the content provider (e.g., 40-50 years old) and assign a score indicating a distance that the user's age is from the range. For example, the media guidance may compute the score by subtracting 2 points out of 100 points for every year that the age is above the range and 3 points out of 100 points for every year that the age is below the range. However, one skilled in the art will realize this is just one exemplary way to calculate a score. Many other methods may be used to determine a score. In this example, the media guidance application may assign the user a score of 90 points out of 100 for a degree the user's age matches the age of interest to the content provider.

In another example, the media guidance application may compare the user's gender (e.g., female) to the gender of interest to the content provider (e.g., male) and may assign a gender match score of zero out of 50 since the two genders did not match. In this example, the number of total points used in the gender score may be lower than the total number of points used in the age score as the media guidance application may identify gender to be half as important of a user profile characteristic as age (i.e., the total number of points (or weight) assigned to the gender user profile characteristic is half that of the age user profile characteristic). For example, the media guidance application may determine that gender is a less important user profile characteristic than age by generating statistics for users who watch an advertisement for a local concert or purchase advertised local concert tickets, as described above, and identifying that varying age causes more statistically significant variation in a number of advertisements watched or tickets bought than varying gender.

In another example, the media guidance application may compare the income of the user (e.g., $1,250 per week) to the income of interest to the media content provider (e.g., between $1,000 and $1,500 per week) and may assign an income score of 100 out of 100 points, since the user's income is within the income of interest to the media content provider.

In another example, the media guidance application may compare the geographic location of the user (e.g., Secaucus, N.J.) to a database listing concert stadiums to determine a proximity of a user to a nearest concert stadium. For example, the media guidance application may identify (e.g., by querying a remote database) a zip code corresponding to the location of the user (e.g., 07094). The media guidance application may search, by zip code, in a look-up table comprising zip code-distance pairs to a nearest concert stadium. In this example, the media guidance application may determine that the user is approximately two miles from the closest concert stadium. Based on the distance determination, the media guidance application may identify a function mapping distance to a number of points for a score. For example, the media guidance application may create a mapping function wherein a number of points are subtracted from 100 (e.g., a maximum number of points) at an increasing rate per mile of distance from a closest stadium. For example, the media guidance application may subtract one point for the first mile of distance from the stadium and two points for the next mile of distance from the stadium. In some embodiments, the media guidance application may query the content provider for the mapping function or may retrieve a stored mapping function from memory.

In some embodiments, the media guidance application may intelligently derive a mapping function based on multiple profile characteristics. For example, the media guidance application may determine that a user lives 20 miles from a closest concert stadium; however, the user does not have a car. The media guidance application may factor a multiplier into the mapping function such that more points per mile are deducted from a score corresponding to a user without a car than points per mile deducted from a user with a car (e.g., because having a car might make transportation to the concert stadium more feasible, resulting in a greater likelihood that the user will purchase an advertised local concert ticket).

In some embodiments, the media guidance application may then determine an overall degree to which the first user profile characteristics correspond to the user profile by calculating an overall score (e.g., by adding the scores and dividing by the total possible points of the scores. In an example, the media guidance application may compute the degree to be 0.76, (e.g., by computing a weighted sum of the score of the user profile characteristics).

In some embodiments, the media guidance application may compare the degree to a threshold value to determine whether the user may be of interest to the content provider. For example, the media guidance application may query the content provider for a minimum degree to which the user must match the first user profile characteristics. For example, the media guidance application may receive a minimum threshold, such as a score of 0.5, for which the score of a user must be greater to receive a subscription discount.

In some embodiments, the media guidance application may, based on the degree to which the first user profile characteristics correspond to the user profile, determine first subscription terms for the first subscription. For example, the media guidance application may integrate variable subscription discounts into subscription terms for a user based on a degree calculated for the user by the media guidance application. For example, the media guidance application may calculate the degree as 0.76 for a first user. The media guidance application may access a promotion look-up table comprising a plurality of degree-promotion pairs to identify a promotion corresponding to a degree of 0.76. For example, the media guidance application may determine that the first user, matching with a degree of 0.76, may be eligible for a one-month free promotion. In another example, the media guidance application may identify a two-month free promotion for a second user matching with a degree of 0.95, by, for example, looking up the degree of 0.95 in the promotion look-up table. In another example, the media guidance application may determine a discrete function, such as a step function, or a continuous function (e.g., linear mapping) to map a degree to a promotion (e.g., a number of free months).

In some embodiments, the media guidance application may determine subscription terms based on the degrees or scores of multiple profile characteristics. For example, the media guidance application may determine that a user likes to go to local concerts (e.g., because the media guidance application identifies the user as matching a target demographic, retrieves a user's purchase history comprising local concert tickets or detecting that the user is part of a "I<3 Going 2 Local Concerts" group on Facebook. The media guidance application may detect that the user's geographic location degree is high (e.g., the user's geographic location is close to a concert stadium). The media guidance application may determine subscription terms comprising free concert tickets at a concert stadium closest to the user in a 12-month subscription term. In another example, the media guidance application may determine that a user is geographically far from a concert stadium and does not have an income reflective of users who purchase concert tickets; however, said user always watches advertisements related to local concerts (e.g., based on a viewing history identifying frequent viewing of advertisements directed to local concerts). In this example, the media guidance application may determine subscription terms to comprise a price discount (e.g., instead of concert tickets) and a 12-month term. Although the media guidance application may determine that the user does not match all user profile characteristics of interest to the content provider, the media guidance application may still present the user with a promotion.

In some embodiments, the media guidance application may query the content provider for the subscription terms. For example, the media guidance application may transmit a query to the content provider comprising information about how closely a user matches user profile characteristics of interest to the content provider (e.g., the degree). The media guidance application may receive in response to the query subscription terms corresponding to the user.

In some embodiments, the media guidance application may transmit a first subscription request featuring the first subscription terms to the first content provider. For example, the media guidance application may transmit, over a network connection of the media guidance application, a packet comprising data of the subscription terms and data related to the degree to which the user profile matches profile characteristics of interest to the first content provider, to a remote server at the location of the first content provider. As an example, the media guidance application may generate and transmit the packet using communications circuitry accessible to the media guidance application.

In some embodiments, the media guidance application waits for a confirmation of the first subscription terms from the content provider. For example, the media guidance application may query the content provider with the subscription terms and may wait for the content provider to return a response approving the subscription terms. When the media guidance application receives approval of the subscription terms (e.g., by receiving a packet from the content provider over a network connection) the media guidance application may propose the subscription terms to a user, by, for example, generating for display the subscription terms to the user on a display screen accessible to the media guidance application or by sending a user an email or text message with the subscription terms.

In another example, the media guidance application may receive pre-approved subscription terms from a content provider. For example, the media guidance application may receive a promotion from a content provider, such as a promotion to give a 5% subscription discount to all users matching a degree greater than 0.95.

In some embodiments, the media guidance application may receive conditionally approved subscription terms from a content provider. For example, the media guidance application may receive subscription terms (e.g., from the content provider), authorizing a 10% discount if the media guidance application can subscribe 5,000 users to the content provider.

In some embodiments, the media guidance application may request a discount from a content provider after a threshold number of users establish subscriptions with the content provider. For example, the media guidance application may determine that 10,000 subscribers subscribed to HBO within the past month. The media guidance application may request from HBO a discount for all the users subscribed in the past month. In response to receiving an approval from HBO for the 10% discount, the media guidance application may automatically apply the discount to future subscription payments for the 10,000 users. In some embodiments, the media guidance application may consume the 10% discount as profit. For example, the media guidance application may not notify the users of the discount and may instead hold the cost savings as profit.

In some embodiments, the media guidance application may generate for display on a display screen connected to the media guidance application the subscription terms along with a prompt allowing a user to subscribe to the subscription. In some embodiments, the media guidance application provides a link for the user to continue to an application or a webpage hosted by the content provider to sign up for the subscription under the subscription terms.

In some embodiments, the media guidance application may detect that a user will cancel a subscription to a content provider by detecting that a subset of media assets will no longer be available from the content provider at a future date. For example, the media guidance application may detect that a user only watches the television series "Game of Thrones" corresponding to content provider HBO. The media guidance application may detect that the television show "Game of Thrones" will no longer be available at a future date and that the show will return about a year after the future date using the methods described above. Upon the detection, the media guidance application may calculate a probability that the user will request to cancel the subscription on the future date by, for example, examining user prior behavior in a subscription history (e.g., identifying any instances where a user canceled a subscription right after a season of shows consumed by the user ended) or, for example, determining other media assets available to the user after the future date (e.g., if other media assets of interest to the user are available after the future date, the media guidance application may estimate a lower probability that the user will cancel service at the future date). The media guidance application may compare the probability to a threshold (e.g., a threshold stored in memory) to determine whether the user is expected to cancel the subscription (e.g., the probability is above the threshold).

In some embodiments, the media guidance application may determine subscription terms in response to detecting that the user is going to cancel a second content subscription to a second content provider. For example, the media guidance application may determine that, at full subscription price, a user may only keep an HBO subscription during the season of "Game of Thrones." However, the media guidance application may determine, (e.g., via information received from HBO) that customer retention is more important to the content provider than total subscription price. The media guidance application may, for example, generate subscription terms, wherein the terms cover 12 months (e.g., to cover the period between the end of a first season of "Game of Thrones" and the beginning of a second season of "Game of Thrones") at a cost substantially equal to, or marginally more than the cost to have a regular subscription during a season of "Game of Thrones."

In some embodiments, the media guidance application may receive information from the user to populate the user profile. For example, the media guidance application may receive information, such as a total cost. The media guidance application may retrieve the total cost from the user profile and may only recommend subscriptions less than the total cost.

In some embodiments, the information received by the user is compared to a first user profile characteristic to determine a degree to which the first user profile characteristic corresponds to the user profile. For example, the user may input information, such as a maximum total subscription cost the user wants to spend each month. The media guidance application may store the information in a user profile associated with the user. The media guidance application may determine a degree by equating whether the maximum total subscription cost is greater than a cost associated with the content provider, and assigning a score of 0 if the cost associated with the content provider is greater, or a score of 1 if the cost associated with the content provider is less.

In some embodiments, the media guidance application may generate for display to the user a first promotion for a first subscription based on the information input by a user to the user profile. For example, the media guidance application may determine a subscription as described above based on the profile information input by a user. The media guidance application may generate for display a prompt containing information about the first subscription and a link to sign up for the subscription.

In some embodiments, the media guidance application may receive an update to the profile information provided by the user. For example, the media guidance application may detect user input at a text box of the media guidance application comprising an updated yearly income corresponding to the user.

In some embodiments, the media guidance application may generate for display to the user a second promotion for the first subscription based on the updated information. For example, the media guidance application may determine a second subscription and subscription terms for a content provider in accordance with the method outlined above. The media guidance application may generate for display the updated promotion in a prompt to the user comprising the subscription terms and a link to subscribe to the content provider.

In some embodiments, the media guidance application may identify a second subset of the plurality of media assets available from a second content provider of the plurality of content providers, wherein the user requires a second subscription to the second content provider to access the first subset. For example, the media guidance application may identify a second subset of media assets (e.g., all media assets from a second content provider) of the plurality of media assets available from all content providers. In some embodiments, the media assets of the first subset may match some or all of the media assets of the second subset. For example, both subsets may comprise all "Harry Potter" movies.

In some embodiments, the media guidance application may retrieve second user profile characteristics of interest to the second content provider. As described above, the media guidance application may request a set of user profile characteristics from the second content provider or may infer the characteristics based on aspects of the second content provider.

In some embodiments, the media guidance application may compare the second user profile characteristics to the user profile. As described above, the media guidance application may compare user profile data, such as a user's income, to user profile characteristics of interest to the second content provider, such as a target income of interest to the content provider.

In some embodiments, the media guidance application may, based on comparing the second user profile characteristics to the user profile, determine a degree to which the second user profile characteristics correspond to the user profile. For example, as described above, the media guidance application may derive a score or degree to which data from the user profile matches a profile characteristic. For example, a distance formula may be used to map a number of points to a particular age, income, media consumption rate, etc.

In some embodiments, the media guidance application may determine second subscription terms for the second subscription based on the degree to which the second user profile characteristics correspond to the user profile. For example, the media guidance application may determine that user profile characteristics match a user profile by a degree of 0.9 out of 1 using the methods described above, Based on the computed degree, the media guidance application may identify subscription terms by, for example, offering a greater discount to users who have a degree closer to 1 (e.g., the highest degree).

In some embodiments, the media guidance application may transmit a second subscription request featuring the second subscription terms to the second content provider. For example, the media guidance application may transmit the second subscription terms to the second content provider to, for example, request approval of the terms. For example, the media guidance application may generate a packet containing information about the second subscription terms for transmission over communications circuitry accessible to the media guidance application.

In some embodiments, the media guidance application may retrieve a subscription term criterion from the first content provider, wherein the subscription term criterion indicates subscription terms acceptable to the first content provider based on the user profile. For example, the media guidance application may receive a criterion indicating an approval of the subscription terms sent by the media guidance application.

In some embodiments, the media guidance application may enable two content providers to bid for a user. For example, the media guidance application may notify the first content provider of the second subscription request. For example, the media guidance application may transmit a packet over a network connection of the media guidance application (e.g., using communications circuitry of the media guidance application) informing the first content provider that the second subscription request was transmitted. In another example, the notification may comprise data indicting details about the second subscription terms, such as an associated cost and subscription length. In another example, the notification may only be sent to the first media content provider if the first subscription terms have a cost greater than the second subscription terms.

In some embodiments, the first content provider is queried by the media guidance application for an updated to the subscription term criterion. For example, the media guidance application may receive a request to update the subscription terms from the first content provider based on the notification. For example, the media guidance application may receive a lower subscription cost from the first content provider in response to the notification that the subscription cost corresponding to the second content provider is lower than the subscription cost corresponding to the first content provider.

In some embodiments, the update subscription term criterion is based on the user subscribing to both the first content provider and the second content provider. For example, in response to receiving the notification, the first content provider may update the subscription terms to include a joint subscription with the second content provider. For example, the media guidance application may generate one subscription, wherein the subscription grants a user access to all media assets of the first and the second content provider.

Figure 2:
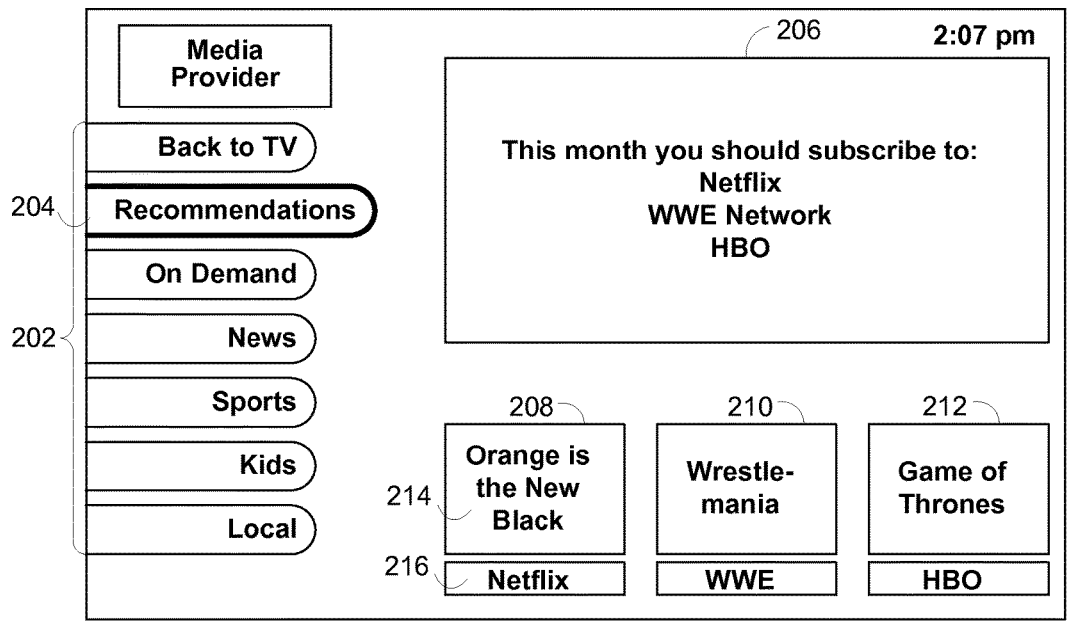
FIG. 2 shows another illustrative example of a media guidance display that may be presented in accordance with some embodiments of the disclosure.

In some embodiments, the media guidance application may manage user access to content providers through user interaction with an element of the illustrative display screens depicted in FIGS. 1-2. FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, recommendations option 204 is selected, thus providing recommendations 206, 208, 210, and 212 as recommendations for content providers to which a user should request access. In display 200 the recommendations may provide graphical images including cover art, still images from the content, video clip previews, live video from the content, or other types of content that indicate to a user the content being described by the media guidance data in the recommendation. Each of the graphical content provider recommendations may also be accompanied by text to provide further information about the content associated with the content provider. For example, recommendation 208 may include more than one portion, including media asset portion 214 and content provider portion 216. Media asset portion 214 and/or content provider portion 216 may be selectable to view content in full-screen, to view information related to the media asset displayed in media asset portion 214, to view information about the content provider displayed in content provider portion 216 or to request access to a content provider recommended by the media guidance application.

The recommendations in display 200 are of different sizes (i.e., recommendation 206 is larger than recommendations 208, 210, and 212), but if desired, all the recommendations may be the same size. Recommendations may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 3:
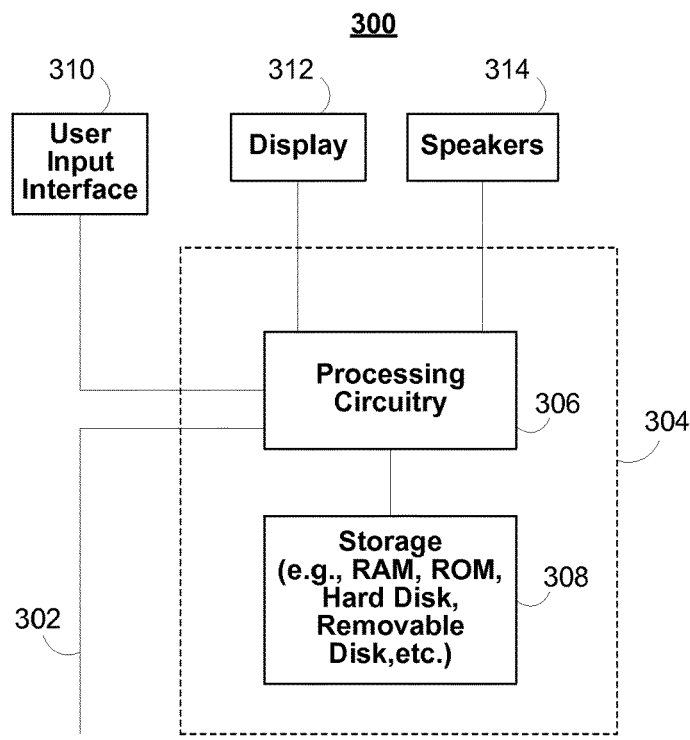
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Control circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some embodiments, the media guidance application may be encoded using a markup language such as HTML5 or XHTML5 and may be interpreted by a browser running on control circuitry 304. In some embodiments, the media guidance application may be encoded in Flash or JavaScript code embedded into a HTML or XHTML code or standalone. Control circuitry 304 may run a virtual machine or an interpreter to run the Flash or JavaScript code. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
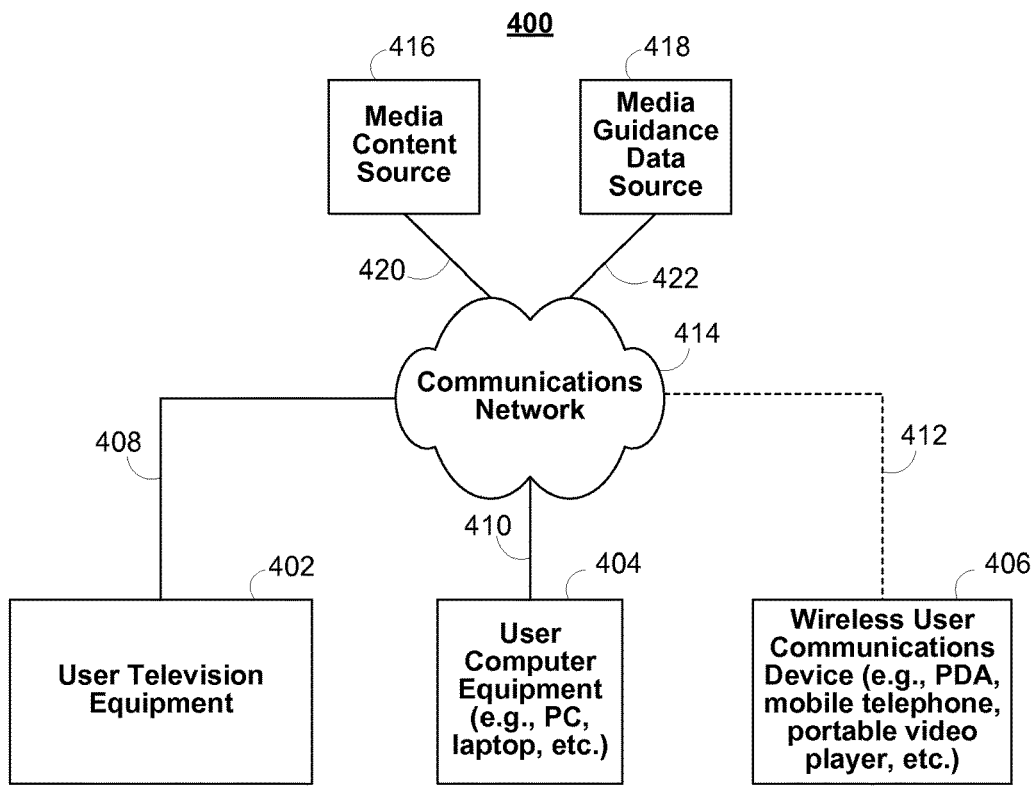
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired).

Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. YouTube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a laptop, tablet, or smartphone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, which provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

Figure 5:
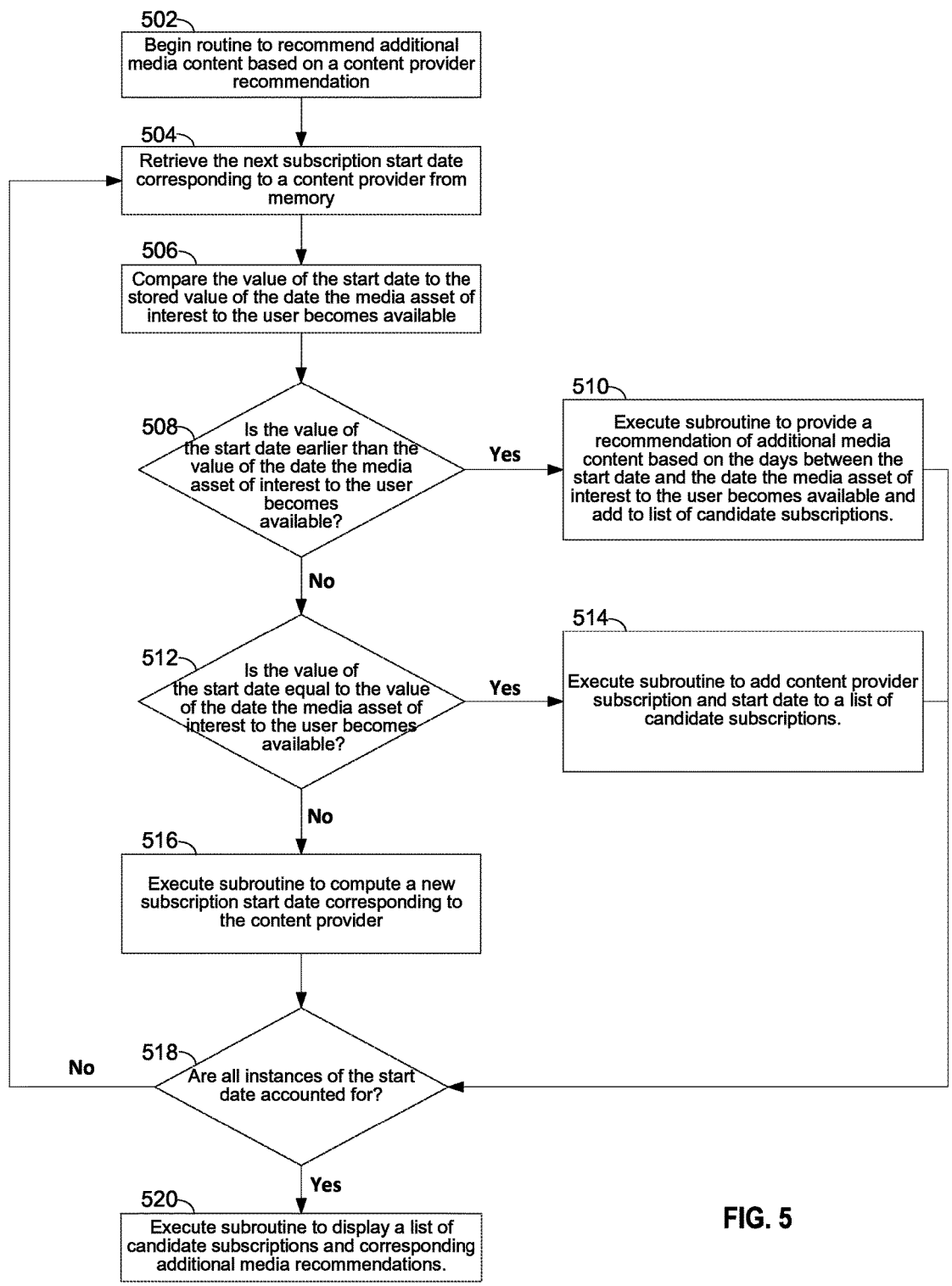
FIG. 5 is a flowchart of illustrative steps for recommending additional media content based on a content provider recommendation in accordance with some embodiments of the disclosure.

FIGS. 5 and 6 present an algorithm for control circuitry (e.g., control circuitry 304) to provide subscription recommendations to a user in accordance with some embodiments of the disclosure. In some embodiments this algorithm may be encoded onto a non-transitory storage medium (e.g., storage device 308) as a set of instructions to be decoded and executed by processing circuitry (e.g., processing circuitry 306). Processing circuitry may in turn provide instructions to other sub-circuits contained within control circuitry 304, such as the tuning, video generating, encoding, decoding, encrypting, decrypting, scaling, analog/digital conversion circuitry, and the like.

The flowchart in FIG. 5 describes an algorithm for control circuitry (e.g., control circuitry 304) to recommend additional media content based on a content provider recommendation in accordance with some embodiments of the disclosure.

At step 502, the algorithm to recommend additional media content will begin based on a content provider recommendation. In some embodiments, this may be done either directly or indirectly in response to a user action or input (e.g., from signals received by control circuitry 304 from detection module 316 or user input interface 310). For example, the algorithm may begin directly in response to control circuitry 304 receiving signals from user input interface 310, or control circuitry 304 may prompt the user to confirm his or her input using a display (e.g., by generating a prompt to be displayed on display 312) prior to running the algorithm.

At step 504, control circuitry 304 proceeds to retrieve the next instance of a subscription start date corresponding to a content provider from stored memory. In some embodiments, control circuitry 304 may receive a single primitive data structure that represents the value of a subscription start date. In some embodiments the value may be stored as part of a larger data structure, and control circuitry 304 may retrieve the value by executing appropriate accessor methods to retrieve the value from the larger data structure.

At step 506, control circuitry 304 proceeds to compare the value of a subscription start date to the stored value of the date the media asset of interest to the user becomes available. In some embodiments, the value of the date the media asset of interest to the user becomes available may be stored (e.g., on storage device 308) prior to beginning the algorithm. In some embodiments the value of the date the media asset of interest to the user becomes available may also be retrieved for each and every instance of a subscription start date corresponding to the content provider, and the value of start date may change from iteration to iteration.

At step 508, control circuitry 304 compares the values of the start date and the date the media asset of interest to the user becomes available to determine if the start date is earlier than the date the media asset of interest to the user becomes available. If the condition is satisfied, the algorithm proceeds to 510; if the condition is not satisfied, the algorithm proceeds to 512 instead.

At step 510, control circuitry 304 will execute a subroutine to provide a recommendation of additional media content based on the days between the start date and the date the media asset of interest to the user becomes available based on the condition at step 508 being satisfied. After the subroutine is executed, the algorithm proceeds to step 518 where it is determined whether all instances of the start date are accounted for and whether further iterations are needed.

At step 512, control circuitry 304 compares the start date and the date the media asset of interest to the user becomes available to determine if the start date is equal to the date the media asset of interest to the user becomes available. If the condition is satisfied, the algorithm proceeds to step 514; if the condition is not satisfied, the algorithm proceeds to step 516 instead.

At step 514, control circuitry 304 executes a subroutine to add the content provider and subscription start date to a list of candidate subscriptions based on the condition of step 512 being satisfied. After the subroutine is executed, the algorithm proceeds to step 518 where it is determined whether all instances of the start date are accounted for and whether further iterations are needed.

At step 516, control circuitry 304 executes a subroutine to compute a new subscription start date corresponding to the content provider based on both of the conditions in step 508 and step 512 not being satisfied. After the subroutine is executed, the algorithm proceeds to step 518 where it is determined whether all instances of the start date are accounted for and whether further iterations are needed.

At step 518, control circuitry 304 checks if all instances of the start date are accounted for. If all of the instances have been evaluated, control circuitry 304 may proceed to step 520. If there are still instances that need to be processed, control circuitry 304 may proceed to step 504.

At step 520, control circuitry 304 executes a subroutine to display a list of candidate subscriptions and corresponding additional media recommendations as described above.

It is contemplated that the descriptions of FIG. 5 may be used with any other embodiment of this disclosure. In addition, the descriptions described in relation to the algorithm of FIG. 5 may be done in alternative orders or in parallel to further the purposes of this disclosure. For example, conditional statements and logical evaluations, such as those at 508 and 512, may be performed in any order or in parallel or simultaneously to reduce lag or increase the speed of the system or method. As a further example, in some embodiments several instances of the start date may be evaluated in parallel, using multiple logical processor threads, or the algorithm may be enhanced by incorporating branch prediction. Furthermore, it should be noted that the algorithm of FIG. 5 may be implemented on a combination of appropriately configured software and hardware, and that any of the devices or equipment discussed in relation to FIGS. 3-4 could be used to implement one or more portions of the algorithm.

The pseudocode in FIG. 6 describes an algorithm to recommend additional media content based on a content provider recommendation in accordance with some embodiments of the disclosure. It will be evident to one skilled in the art that the algorithm described by the pseudocode in FIG. 6 may be implemented in any number of programming languages and a variety of different hardware, and that the style and format should not be construed as limiting, but rather a general template of the steps and procedures that would be consistent with code used to implement some embodiments of this disclosure.

At line 601, control circuitry 304 runs a subroutine to initialize variables and prepare to recommend additional media content based on a content provider recommendation, which begins on line 605. For example, control circuitry 304 may copy instructions from a non-transitory storage medium (e.g., storage device 308) into RAM or into the cache for processing circuitry 306 during the initialization stage. Additionally, in some embodiments, the date the media asset of interest to the user becomes available used for comparison may be retrieved, set and stored.

At line 605, control circuitry 304 receives instances of subscription start dates corresponding to a content provider. In some embodiments these instances may be retrieved from stored memory.

At line 606, control circuitry 304 iterates through the various instances of start dates; if only a single instance is available, control circuitry 304 will only execute the loop once. This loop may be implemented in multiple fashions depending on the choice of hardware and software language used to implement the algorithm of FIG. 6; for example, this may be implemented as part of a "for" or "while" loop.

At line 607, control circuitry 304 stores the value of the start date into a temporary variable "A." In some embodiments the value of the start date will be stored as part of a larger data structure or class, and the value of the start date may be obtained through appropriate accessor methods. In some embodiments, the start date may be converted from a string or other non-numeric data type into a numeric data type by means of an appropriate hashing algorithm. In some embodiments start date may be encoded as a primitive data structure, and rather than using a temporary variable, the start date may be directly used in the comparisons at lines 609 and 611.

At line 608, control circuitry 304 stores the value of the date the media asset of interest to the user becomes available into a temporary variable "B." Similar to the start date, in some embodiments the date the media asset of interest to the user becomes available will be stored as part of a larger data structure or class, and the date the media asset of interest to the user becomes available may be obtained through accessor methods. In some embodiments the date the media asset of interest to the user becomes available may be converted from a string or other non-numeric data type into a numeric data type by means of an appropriate hashing algorithm, or the date the media asset of interest to the user becomes available may be a primitive data structure, and may be directly used in the comparisons at lines 609 and 611.

At line 609, control circuitry 304 compares the value of A to the value of B to see if the date corresponding to B is later than the date corresponding to A. This is achieved by subtracting the value of B from A and then comparing the value of the difference to zero.

At line 610, control circuitry 304 executes a subroutine to recommend additional media content based on the days between A and B using control circuitry 304 if the condition in line 609 is satisfied. In some embodiments this may be achieved by processing circuitry 306 sending the appropriate signals to control circuitry containing instructions for recommending additional media content based on the days between A and B.

At line 611, control circuitry 304 compares the value of A and B to determine if A is equal to B. In some embodiments this comparison will only be done if A is not essentially earlier than B and the comparison in line 609 evaluates to FALSE.

At line 612, control circuitry 304 executes a subroutine to add a content provider and start date to a list of candidate subscriptions using control circuitry 304 if the condition in line 611 is satisfied.

At line 613, control circuitry 304 determines that if neither condition in line 609 or 611 is satisfied, then the instruction at line 614 may be evaluated and executed.

At line 614, control circuitry 304 executes a subroutine to compute a new subscription start date using control circuitry 304 if neither of the conditions at lines 609 or 611 are satisfied.

At line 615, control circuitry 304 executes a subroutine to display a list of possible subscriptions and corresponding additional media content recommendations upon termination of the for loop.

At line 616, control circuitry 304 runs a termination subroutine after the algorithm has performed its function. For example, in some embodiments, control circuitry 304 may destruct variables, perform garbage collection, free memory or clear the cache of processing circuitry 306.

It will be evident to one skilled in the art that the algorithm described by the pseudocode in FIG. 6 may be implemented in any number of programming languages and a variety of different hardware, and the particular choice and location of primitive functions, logical evaluations, and function evaluations are not intended to be limiting. It will also be evident that the code may be refactored or rewritten to manipulate the order of the various logical evaluations, to perform several iterations in parallel rather than in a single iterative loop, or to otherwise manipulate and optimize run-time and performance metrics without fundamentally changing the inputs or final outputs. For example, in some embodiments break conditions may be placed after lines 610 and 612 to speed operation, or the conditional statements may be replaced with a case-switch. In some embodiments, rather than iterating over all instances of the start date at step 506, in some embodiments the code may be rewritten so control circuitry 304 is instructed to evaluate multiple instances of the start date simultaneously on a plurality of processors or processor threads, lowering the number of iterations needed and potentially speeding up computation time.

Figure 7:
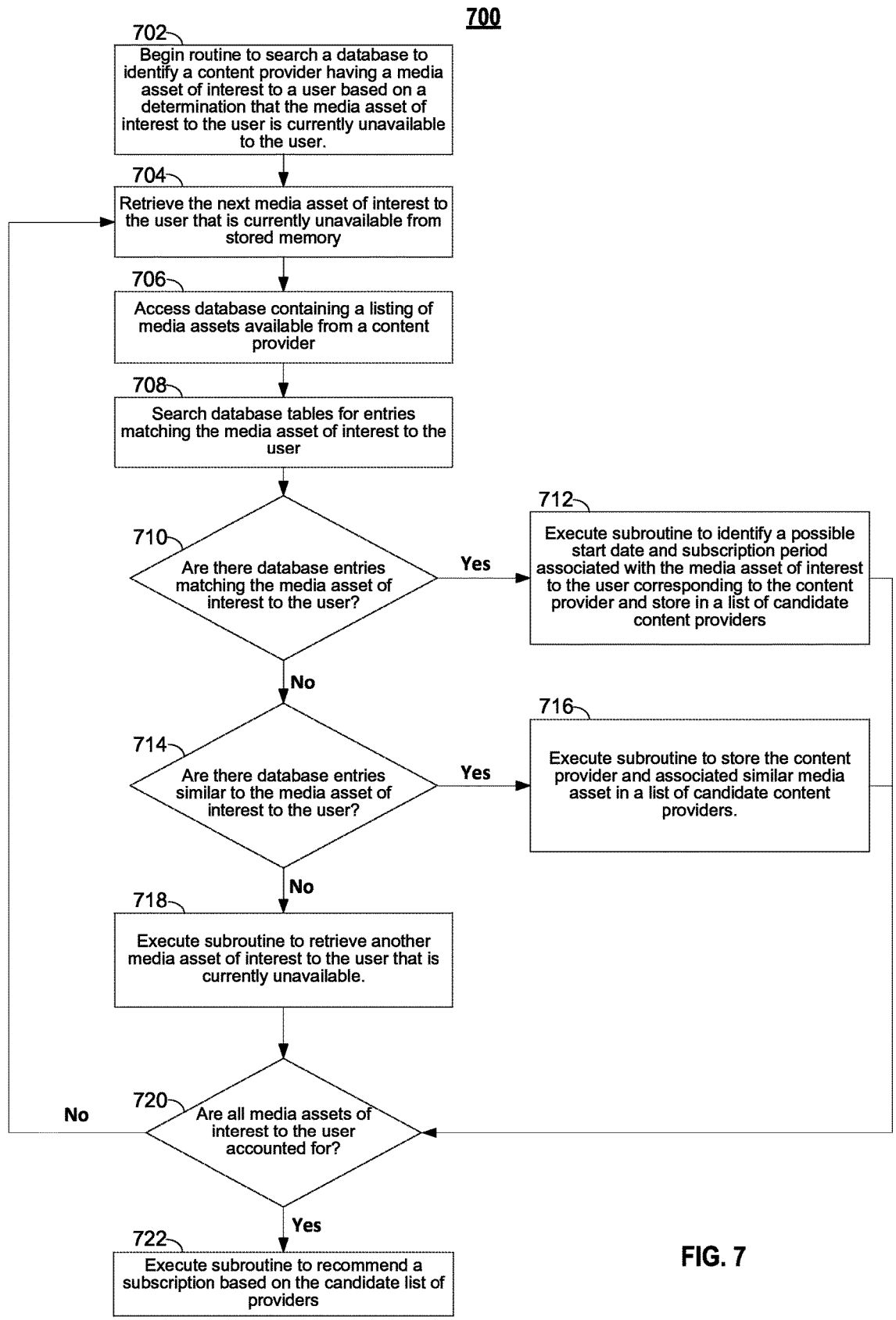
FIG. 7 is a flowchart of illustrative steps for searching a database to identify a content provider having a media asset of interest to a user in accordance with some embodiments of the disclosure.

FIGS. 7 and 8 present an algorithm for control circuitry (e.g., control circuitry 304) to identify a content provider having a media asset of interest to a user based on a determination that the media asset of interest to the user is currently unavailable using a database containing a listing of media assets available from a content provider in accordance with some embodiments of the disclosure. Similar to the algorithms described by FIGS. 5 and 6, in some embodiments this algorithm may be encoded onto a non-transitory storage medium (e.g., storage device 308) as a set of instructions to be decoded and executed by processing circuitry (e.g., processing circuitry 306). Processing circuitry may in turn provide instructions to other sub-circuits contained within control circuitry 304, such as the tuning, video generating, encoding, decoding, encrypting, decrypting, scaling, analog/digital conversion circuitry, and the like.

The flowchart in FIG. 7 describes an algorithm for control circuitry (e.g., control circuitry 304) to search a database and identify a content provider having a media asset of interest to the user that is currently unavailable to the user, in accordance with some embodiments of the disclosure.

At step 702, control circuitry 304 may execute the algorithm to search a database and identify a content provider will begin based on a determination that a media asset of interest to a user is not available. In some embodiments, this may be done either directly or indirectly in response to a user action or input (e.g., from signals received by control circuitry 304 from detection module 316 or user input interface 310.)

At step 704, control circuitry 304 proceeds to retrieve the next instance of the media asset of interest to the user from stored memory. In some embodiments, control circuitry 304 may retrieve a single primitive data structure that represents the value of the media asset of interest to the user. In some embodiments, control circuitry 304 may retrieve the value from a larger class or data structure.

At step 706, control circuitry 304 accesses a database containing a listing of media assets available from a content provider. In some embodiments, this database may be stored locally (e.g., on storage device 308) prior to beginning the algorithm. In some embodiments the database may also be accessed by using communications circuitry to transmit information across a communications network (e.g., communications network 414) to a database implemented on a remote storage device (e.g., media guidance data source 418).

At step 708, control circuitry 304 searches database tables for entries matching the media asset of interest to the user. In some embodiments this may be done by comparing an identifier, for example a string or integer representing the media asset of interest to the user that matches the types of identifiers used inside the database. In some embodiments, control circuitry 304 may submit a general query to the database for table entries matching the media asset of interest to the user, and control circuitry 304 may receive a list of indices or a data structure containing a portion of the database contents. In some embodiments, the database may implement a junction table that in turn compares entries from other databases. In this case, control circuitry 304 may retrieve indices from a first database that in turn can be used to retrieve information from a second database. Although we may describe control circuitry 304 interacting with a single database for purposes of clarity, it is understood that the algorithm of FIG. 7 may be implemented using multiple independent or cross-referenced databases.

At step 710, control circuitry 304 determines whether there are database entries matching the media asset of interest to the user. In some embodiments, control circuitry 304 may receive a signal from the database indicating that there are no matching entries. In some embodiments, control circuitry 304 may instead receive a list of indices or data structures with a NULL or dummy value. If control circuitry 304 identifies that there are database entries matching the media asset of interest to the user, the algorithm proceeds to 712; otherwise the algorithm proceeds to 714.

At step 712, control circuitry 304 executes a subroutine to identify a possible start date and subscription period and add the data to a list of candidate content providers. Afterwards, the algorithm may proceed to step 720 where it is determined whether there are further instances of the media asset of interest to the user that need to be accounted for.

At step 714, control circuitry 304 determines whether there are database entries similar to the media asset of interest to the user. For example, in some embodiments, if the media asset of interest to the user is encoded as a string with multiple characters, control circuitry 304 may perform additional database queries for similar strings with individual characters replaced, removed or added. In some embodiments, control circuitry 304 may also determine whether the original query was a commonly misspelled word, and will submit a query with the correct spelling instead. In another example, the media asset of interest to the user may be encoded as an integer by a hashing function. For example, control circuitry 304 may compute a hash of an episode of a series by prefixing a number uniquely identifying the series to a number identifying the episode within series. Control circuitry 304 may perform additional queries for other integers within a certain range, for example, by holding the prefixed series number fixed and varying the episode number. In some embodiments, control circuitry 304 may compare metadata corresponding to the media asset of interest to the user with metadata corresponding to entries of the database. In some embodiments, control circuitry 304 may retrieve database entries similar to the media asset of interest to the user without further queries being required. If control circuitry 304 identifies that there are database entries similar to the media asset of interest to the user, the control circuitry 304 proceeds to step 716; otherwise control circuitry 304 proceeds to step 718.

At step 716, control circuitry 304 executes a subroutine to store the content provider and associated similar media assets in a list of candidate content providers. Afterwards, control circuitry 304 proceeds to step 720.

At step 718, control circuitry 304 executes a subroutine to retrieve another media asset of interest to the user that is unavailable after determining that there were no matching database entries for the media asset of interest to the user. Afterwards, control circuitry 304 may proceed to step 720.

At step 720, control circuitry 304 determines whether all instances of media assets of interest to the user are accounted for and whether further iterations are needed. If further iterations are needed the algorithm will loop back to step 704 where control circuitry 304 will retrieve the next instance of a media asset of interest to the user. If no further iterations are needed control circuitry 304 proceeds to step 722.

At step 722, control circuitry 304 executes a subroutine to recommend a subscription based on the candidate list of providers.

It is contemplated that the descriptions of FIG. 7 may be used with any other embodiment of this disclosure. In addition, the descriptions described in relation to the algorithm of FIG. 7 may be done in alternative orders or in parallel to further the purposes of this disclosure. For example, control circuitry 304 may submit multiple queries to the database in parallel, or it may submit multiple queries to a plurality of similar databases in order to reduce lag and speed the execution of the algorithm. As a further example, although we have described step 712 and step 716 as being mutually exclusive, both exact entries and similar entries may be processed for a single instance of the media asset of interest to the user. To further this purpose, in some embodiments, step 710 and step 714 may be performed in parallel by control circuitry 304. Furthermore, it should be noted that the algorithm of FIG. 7 may be implemented on a combination of appropriately configured software and hardware, and that any of the devices or equipment discussed in relation to FIGS. 3-4 could be used to implement one or more portions of the algorithm.

The pseudocode in FIG. 8 describes an algorithm to identify a content provider having a media asset of interest to the user in accordance with some embodiments of the disclosure. It will be evident to one skilled in the art that the algorithm described by the pseudocode in FIG. 8 may be implemented in any number of programming languages and a variety of different hardware, and that the style and format should not be construed as limiting, but rather as a general template of the steps and procedures that would be consistent with code used to implement some embodiments of this disclosure.

At line 801, control circuitry 304 runs a subroutine to initialize variables and prepare to identify a content provider having a media asset of interest to the user, which begins on line 805. For example, in some embodiments, control circuitry 304 may copy instructions from a non-transitory storage medium (e.g., storage device 308) into RAM or into the cache for processing circuitry 306 during the initialization stage.

At line 805, control circuitry 304 receives instances of media assets of interest to the user. In some embodiments these instances may be retrieved from stored memory.

At line 806, control circuitry 304 iterates through the various instances of media assets of interest to the user; if only a single instance is available, the loop will only execute once. This loop may be implemented in multiple fashions depending on the choice of hardware and software language used to implement the algorithm of FIG. 8; for example, this may be implemented as part of a "for" or "while" loop, in some programming languages. In some embodiments it may be convenient to store the instances of the media asset of interest to the user in a single class or encapsulated data structure that will perform the loop as part of an internal method.

At line 807, control circuitry 304 queries a database for entries matching the media asset of interest to the user. Depending on how the database is implemented and how the media asset of interest to the user is stored, an intermittent step may be required to convert the media asset of interest to the user into a form consistent with the database. For example, the media asset of interest to the user may be encoded into a string or an integer using an appropriate hashing algorithm prior to being transmitted to the database by control circuitry 304 as part of a query. In some embodiments the media asset of interest to the user may be encoded as a primitive data structure, and control circuitry 304 may submit the media asset of interest to the user as a query to the database directly. After querying the database, control circuitry 304 may receive a set of database entries matching the media asset of interest to the user. In some embodiments, control circuitry 304 may receive these entries in the form of a data structure, a set of indices of the database, or a set of indices of another cross-referenced database.

At line 808, control circuitry 304 determines if there are any database entries matching the media asset of interest to the user. In some embodiments, control circuitry 304 may determine this by checking if the database returned an empty data structure or a NULL value in response to the query in line 807. If there are matching database entries the algorithm may proceed to line 809. If there are no matching database entries the algorithm may instead proceed to line 812.

At line 809, control circuitry 304 retrieves one or more values of an availability date and subscription period from the database entries matching the media asset of interest to the user. For example, if control circuitry 304 retrieves a list of indices after querying the database in line 807, in some embodiments, control circuitry 304 may retrieve the database entries for an availability date and subscription period located at the received indices. In some embodiments the indices may point to a larger data structure contained within the database, and control circuitry 304 may retrieve the values of an availability date and subscription period from within the data structure using appropriate accessor methods. In some embodiments, control circuitry 304 may retrieve the values of an availability date and subscription period and store them in a separate data structure locally (e.g., in storage 308) prior to proceeding further. After retrieving the values of an availability date and subscription period the algorithm will proceed to line 810.

At line 810, control circuitry 304 executes a subroutine to use the values of an availability date and subscription period and identify possible start dates and subscription periods using control circuitry 304. Afterwards, the algorithm may proceed to the termination subroutine at line 814.

At line 811, control circuitry 304 has determined that there were no database entries matching the media asset of interest to the user. In this case, control circuitry 304 proceeds to line 812.

At line 812, control circuitry 304 executes a subroutine to store content provider information and similar media assets in memory using control circuitry 304.

At line 813, control circuitry 304 retrieves another media asset of interest to the user that is currently unavailable.

At line 815, control circuitry 304 executes a subroutine to recommend a subscription based on the list of candidate content providers. Afterwards, control circuitry 304 proceeds to the termination subroutine at line 817.

At line 817, control circuitry 304 executes a termination subroutine after the algorithm has performed its function and all instances of the media asset of interest to the user have been processed and checked against the database. For example, in some embodiments, control circuitry 304 may destruct variables, perform garbage collection, free memory or clear the cache of processing circuitry 306.

It will be evident to one skilled in the art that the algorithm described by the pseudocode in FIG. 8 may be implemented in any number of programming languages and a variety of different hardware, and the particular choice and location of primitive functions, logical evaluations, and function evaluations are not intended to be limiting. It will also be evident that the code may be refactored or rewritten to manipulate the order of the various logical evaluations, to perform several iterations in parallel rather than in a single iterative loop, or to otherwise manipulate and optimize run-time and performance metrics without fundamentally changing the inputs or final outputs. For example, in some embodiments the code may be rewritten so control circuitry 304 is instructed to evaluate multiple instances of media assets of interest to the user and submit multiple database queries simultaneously using a plurality of processors or processor threads. It is also understood that although we may describe control circuitry 304 interacting with a single database, this is only a single embodiment described for illustrative purposes, and the algorithm of FIG. 8 may be implemented using multiple independent or cross-referenced databases. For example, a database stored locally (e.g., on storage 308) may index or cross-reference a database stored remotely (e.g., media guidance data source 418), which may be accessible through any number of communication channels (e.g., communications network 414). In some embodiments, this may allow control circuitry 304 to utilize a look-up table or database front-end efficiently stored on a small local drive to access a larger database stored on a remote server on demand.

FIG. 9 illustrates an example of a user equipment device running (e.g., via control circuitry 304) a media guidance application for managing user access to content providers in accordance with the present disclosure. User equipment device 900 may comprise control circuitry, such as control circuitry 304, a display, such as display 312, a touch screen and buttons, such as user input interface 310 and a speaker, such as speakers 314. User equipment device 900 may comprise executable code stored in a memory, such as storage 308 or other computer readable medium, for running the media guidance application. Control circuitry 304 may generate for display (e.g., on display 312) an icon for application 902 on user equipment device 900. Application 902 may link to code which, when executed by control circuitry 304, may manage user access to a content provider, in accordance with the present disclosure. User equipment device 950 depicts a display screen (e.g., display 312) displaying an exemplary media guidance application for managing user access to a content provider in accordance with the present disclosure. In an embodiment, control circuitry 304 generates for display, on display 312 using control circuitry 304, a reminder message, such as reminder message 952 informing a user when said user needs to subscribe to a content provider. Control circuitry 304 generates for display, on display 312 using control circuitry 304, a calendar visually indicating a start date of a subscription, such as start date indicator 954, as calculated by control circuitry 304 as described above. The media guidance application may generate for display, on display 312 using control circuitry 304, a visual reminder indicating when a media asset of interest to the user will become available. For example, the media guidance application generates for display, using control circuitry 304, a calendar, such as the calendar depicted on user equipment device 950, with a shaded square indicating the date on which the media asset of interest to the user will become available, such as availability date indicator 956. The media guidance application may also generate for display, using control circuitry 304, an indication of the subscription period length, such as subscription period indicator 958 in reminder message 952.

Figure 10:
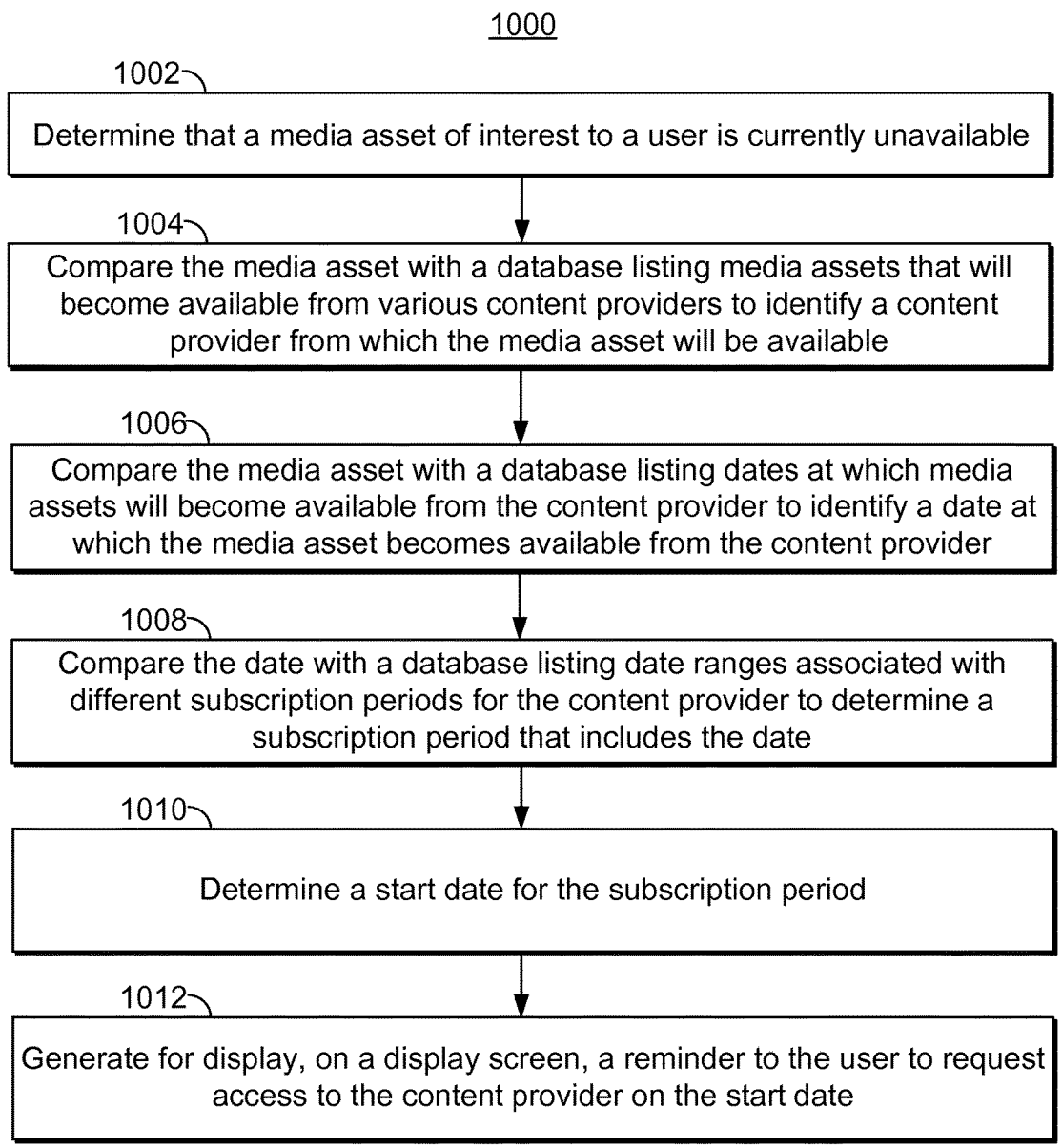
FIG. 10 is a flowchart of illustrative steps for generating a reminder for a user to request access to a content provider in accordance with some embodiments of the disclosure.

FIG. 10 depicts a flowchart of illustrative steps for generating for display a reminder message, such as reminder message 952 in accordance with the present disclosure. It should be noted that process 1000, or any step thereof, could be performed on, or provided by, any of the devices shown in FIGS. 3-4 and 9. For example, process 1000 may be executed by control circuitry 304 as instructed by a media guidance application implemented on user equipment 402, 404, 406 in order to generate for display reminder message 952 reminding a user to request access to a content provider. In addition, one or more steps of process 1000 may be incorporated into or combined with one or more steps of any other process or embodiment (e.g., process 500, 700, 1100, 1200, 1400, and 1600).

At step 1002, control circuitry 304 determines that a media asset of interest to a user is currently unavailable. For example, control circuitry 304 may access, over communications network 414, a database, such as a database located at media guidance data source 418, containing a listing of media assets currently available to the user. The media guidance application may search, using control circuitry 304, for a media asset of interest to the user in the database. If the media asset of interest to the user is not found, the media guidance application determines that the media asset of interest to the user is currently unavailable.

At step 1004, control circuitry 304 compares the media asset with a database listing media assets that will become available from various content providers to identify a content provider from which the media asset will become available. For example, control circuitry 304 may access a database, such as a database located at media guidance data source 418, listing upcoming media assets that will become available from a plurality of providers, over communications network 414, to compare the media asset with the database to identify content providers from which the media asset will become available.

At step 1006, control circuitry 304 compares the media asset with a database listing dates at which media assets will become available from the content provider to identify a date at which the media asset becomes available from the content provider. For example, control circuitry 304 may access a database corresponding to a content provider, such as a database located at media guidance data source 418 via communications network 414, containing information about a date on which content will become available from the provider. The media guidance application may compare the database, using control circuitry 304, with the media asset of interest to the user to identify the date which the media asset will become available.

At step 1008, control circuitry 304 compares the date in a database listing date ranges associated with different subscription periods for the content provider to determine a subscription period that includes the date. For example, control circuitry 304 may access a database, such as a database located at media guidance data source 418, via communications network 414, listing various subscription periods and subscription start and end dates. Control circuitry 304 may determine, as described above, a subscription period that includes the date that the media asset of interest to the user will become available.

At step 1010, control circuitry 304 determines a start date for the subscription period. For example, control circuitry 304 may determine a start date for the subscription period, by identifying a date by, for example, identifying the earliest date on which a user may subscribe to the content provider and still have access to the media asset of interest before the end of the subscription period. For example, the media guidance application may identify, using control circuitry 304, a media asset of interest to the user available in 45 days. The media guidance application may calculate the start date to be 30 days before the day the media asset of interest to the user becomes available for a one-month subscription period.

At step 1012, control circuitry 304 generates for display, on a display screen, such as display 312, a reminder, such as reminder message 952, to the user to request access to the content provider on the start date. The media guidance application may generate for display on display 312, using control circuitry 304, reminder message 952 containing subscription period indicator 958, start date indicator 954 and availability date indicator 956.

It is contemplated that the steps or descriptions of FIG. 10 may be used with any other embodiment of this disclosure. In addition, the steps and descriptions described in relation to FIG. 10 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 and 9 could be used to perform one or more of the steps in FIG. 10.

Figure 11:
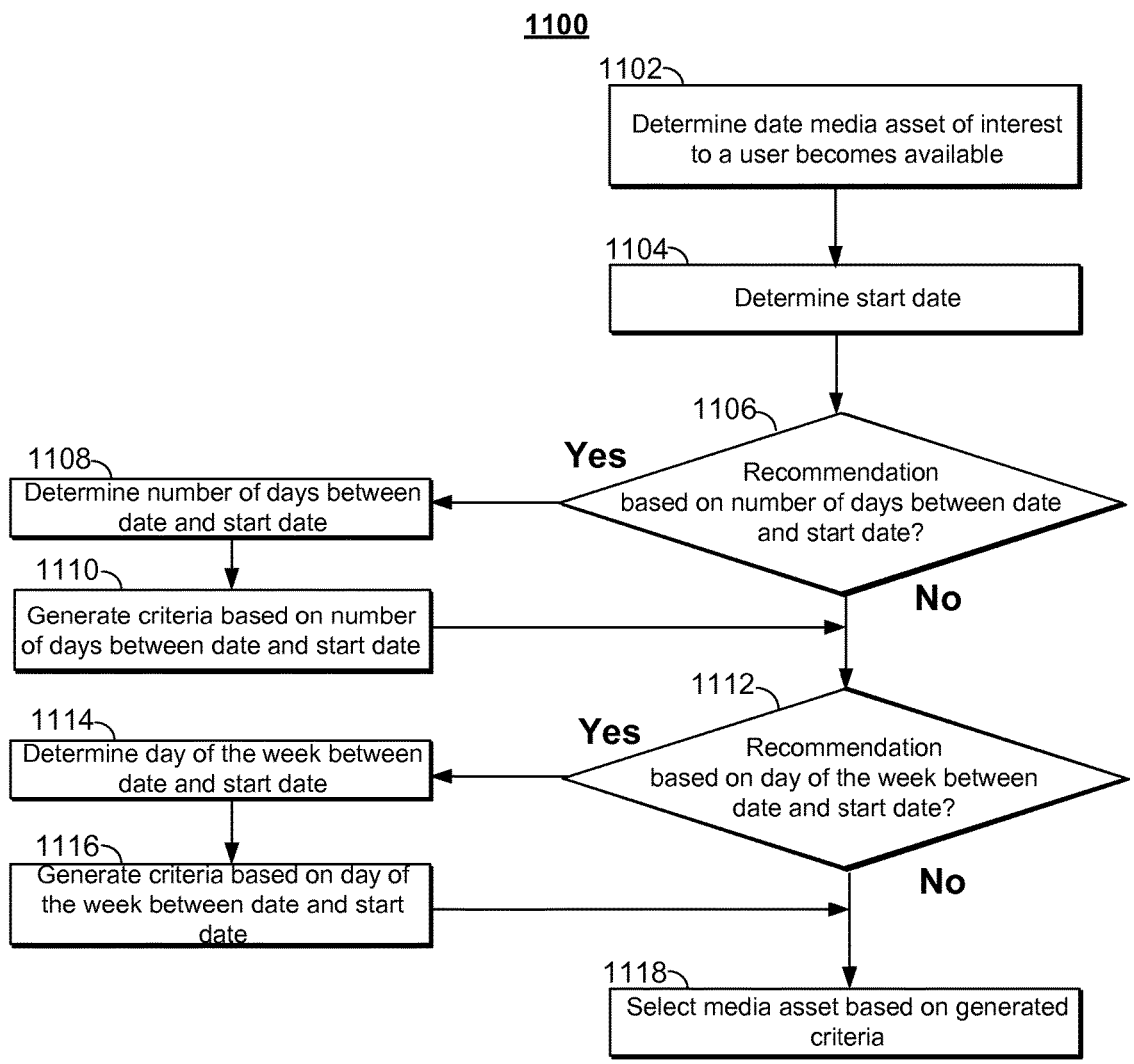
FIG. 11 is a flowchart of illustrative steps for recommending a media asset to a user in accordance with some embodiments of the disclosure.

FIG. 11 depicts a flowchart of illustrative steps for providing a recommendation to a user in accordance with the present disclosure. It should be noted that process 1100, or any step thereof, could be performed on, or provided by, any of the devices shown in FIGS. 3-4 and 9. For example, process 1100 may be executed by control circuitry 304 as instructed by a media guidance application implemented on user equipment 402, 404, and/or 406 in order to generate a recommendation. In addition, one or more steps of process 1100 may be incorporated into or combined with one or more steps of any other process or embodiment (e.g., process 500, 700, 1000, 1200, 1400, and 1600).

At step 1102, control circuitry 304 determines a date a media asset of interest to a user becomes available. For example, the media guidance application may identify, using control circuitry 304, a media asset of interest to the user as described above. Control circuitry 304, may compare the media asset of interest to the user with a database, such as a database located at media guidance data source 418 via communications network 414, containing availability dates of media assets corresponding to a content provider to identify a date that the media asset of interest to the user will become available.

At step 1104, control circuitry 304 determines a start date. For example, the media guidance application may determine, using control circuitry 304, the start date to be a day before the media asset of interest to the user will become available. This is just an exemplary method the media guidance application may use to determine the start date; the media guidance application may determine, using control circuitry 304, the start date using any of the steps described above.

At step 1106, control circuitry 304 determines if a recommendation is to be made based on the number of days between the start date and the date the media asset of interest to the user becomes available. For example, the media guidance application may retrieve, using control circuitry 304, from a user profile stored in storage 308, a setting indicating whether a user would like to be provided with recommendations based on the number of days. In another example, control circuitry 304 may prompt a user as to whether the user would like a recommendation based on the number of days. The media guidance application may generate for display, on display 312 using control circuitry 304, a prompt, said prompt requesting user input via user input interface 310 as to whether said user wants a recommendation based on the number of days. If the media guidance application detects, using control circuitry 304, that a recommendation based on the number of days is to be provided by control circuitry 304, control circuitry 304 proceeds to step 1108. Otherwise, the control circuitry 304 proceeds to step 1112.

At step 1108, control circuitry 304 determines the number of days between the date and the start date. For example, the media guidance application may calculate, using control circuitry 304, the number of days between the date and the start date as described above. For example, control circuitry 304 may subtract, using control circuitry 304 the date the media asset of interest becomes available from the start date.

At step 1110, control circuitry 304 generates criteria based on the number of days between the date and the start date. For example, the media guidance application may generate, using control circuitry 304, a criterion, such as threshold number of media assets to recommend based on the number of days (e.g., in order for the user to have at least one media asset to consume each day). The media guidance application may generate, using control circuitry 304, a criterion based on the number of days in accordance with any of the steps mentioned above.

At step 1112, control circuitry 304 determines whether a recommendation based on a day of the week between the date and the start date is to be generated by control circuitry 304. For example, the media guidance application may retrieve, using control circuitry 304, user profile data indicating a user preference for recommendations based on the day of the week. For example, the media guidance application may retrieve, using control circuitry 304, user profile data from a memory, such as storage 308, indicating that a user only consumes media assets on the weekends. The media guidance application may determine, using control circuitry 304, that a recommendation should be provided by the media guidance application for a day of the week, such as a Saturday or Sunday (i.e., a day of the weekend). In another example, the media guidance application may prompt the user, using control circuitry 304 by generating for display on display 312, for instructions on whether to proceed with providing a recommendation based on a day of the week. The media guidance application may receive, at control circuitry 304 via user input interface 310, a request to provide a recommendation based on a day of the week. If the media guidance application determines, using control circuitry 304, that a recommendation based on the day of the week is to be provided, control circuitry 304 may proceed to step 1114. Otherwise, the media guidance application may proceed to step 1118.

At step 1114, control circuitry 304 determines a day of the week between the date and the start date. For example, the media guidance application may prompt, by displaying a message on display 312 using control circuitry 304, a request for user input of a day of the week. For example, the media guidance application may receive, at control circuitry 304, user input, via user input interface 310, indicating a day of the week. In another example, the media guidance application may determine, using control circuitry 304, the day of the week by retrieving user profile data (e.g., using control circuitry 304 by accessing a user profile database via communications network 414 located at media guidance data source 418) and determining a day of the week on which the user consumes the most media assets. For example, the media guidance application may receive, using control circuitry 304, a vector listing a number of media assets consumed by a user for each day of the week. The media guidance application may analyze the vector, using control circuitry 304, to determine the maximum number in the vector and a position corresponding to the maximum number. The media guidance application may correlate, using control circuitry 304, the position in the vector to a day of the week, by, for example, comparing the position in the vector to values in a lookup table located in memory, such as storage 308. Control circuitry 304 may use the day of the week from the comparison with the look-up table as the day of the week.

At step 1116, control circuitry 304 generates criteria based on a day of the week between a date that the media asset of interest to the user is available and a start date. The media guidance application may generate a criterion, such as a user preference corresponding to a day of the week, using control circuitry 304. For example, the media guidance application may determine, by accessing user profile information located in a database using control circuitry 304, such as a database of user information in media guidance data source 418 via communications network 414, that a user prefers to consume a specific type of media assets on a specific day of the week. For example, the media guidance application may use control circuitry 304 to determine that a user consumes mostly movies on Saturday by enumerating the type of media assets consumed by a user on Saturday (e.g., based on user profile information) and determining the most prevalent type of media asset. The media guidance application may generate, using control circuitry 304, a criterion, such as a criterion requiring a recommendation of a movie (i.e., as opposed to a show, documentary, music album, etc.). However, this is just an exemplary type of criterion that may be generated by a media guidance application. One of ordinary skill in the art will realize that many types of criteria, such as a genre criteria, actor/actress criteria, etc., may be generated using similar steps. In another example, the media guidance application may determine, using control circuitry 304, that a user watches a specific number of media assets during a day of the week as described above. For example, the media guidance application may determine that a user consistently consumes ten media assets on Saturday. The media guidance application may generate, using control circuitry 304, a criterion, such as a criterion indicating a number of media assets to recommend to a user.

At step 1118, control circuitry 304 selects a media asset based on generated criteria. For example, in the example where the media guidance application determines criteria such as a type of media asset, the media guidance application may select, using control circuitry 304, a media asset matching the asset type. The media guidance applications may access, via communications network 414 using control circuitry 304, a database, such as a database of media assets available to a user in media guidance data source 418. The media guidance application may apply multiple criteria, using control circuitry 304, to select the media. For example, the media guidance application may apply a second criterion, generated by the media guidance application using control circuitry 304, such as a genre (e.g., horror genre). For example, the media guidance application may select, using control circuitry 304, a media asset such that the media asset is movie of the horror genre as described above.

It is contemplated that the steps or descriptions of FIG. 11 may be used with any other embodiment of this disclosure. In addition, the steps and descriptions described in relation to FIG. 11 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 and 9 could be used to perform one or more of the steps in FIG. 11.

Figure 12:
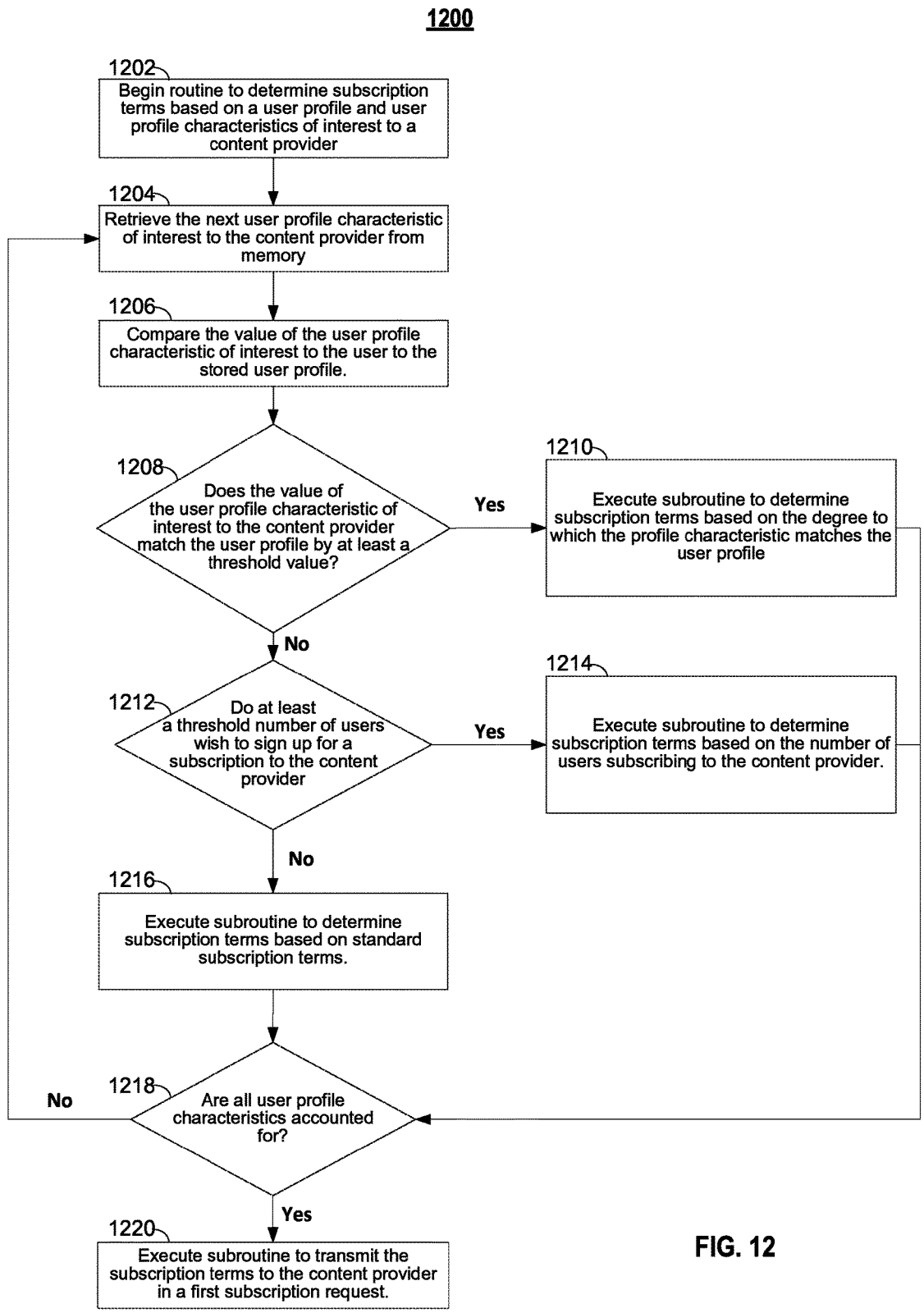
FIG. 12 is a flowchart of illustrative steps for determining subscription terms based on a user profile and user profile characteristics of interest to a content provider in accordance with some embodiments of the disclosure.

FIGS. 12 and 13 present an algorithm for control circuitry (e.g., control circuitry 304) to determine subscription terms based on a user profile and user profile characteristic of interest to a content provider in accordance with some embodiments of the disclosure. In some embodiments, this algorithm may be encoded onto a non-transitory storage medium (e.g., storage device 308) as a set of instructions to be decoded and executed by processing circuitry (e.g., processing circuitry 306). Processing circuitry may in turn provide instructions to other sub-circuits contained within control circuitry 304, such as the tuning, video generating, encoding, decoding, encrypting, decrypting, scaling, analog/digital conversion circuitry, and the like.

The flowchart in FIG. 12 describes an algorithm for control circuitry (e.g., control circuitry 304) to determine subscription terms in accordance with some embodiments of the disclosure.

At step 1202, control circuitry 304 executes the algorithm to determine subscription terms based on user input requesting management of a subscription. In some embodiments, this may be done either directly or indirectly in response to a user action or input (e.g., from signals received by control circuitry 304 or user input interface 310). For example, the algorithm may begin directly in response to control circuitry 304 receiving signals from user input interface 310, or control circuitry 304 may prompt the user to confirm his or her input using a display (e.g., by generating a prompt to be displayed on display 312) prior to running the algorithm.

At step 1204, control circuitry 304 proceeds to retrieve the next user profile characteristic of interest to the content provider from memory. In some embodiments, control circuitry 304 may receive a single primitive data structure that represents the value of the profile characteristic of interest to the content provider. In some embodiments the value may be stored as part of a larger data structure, and control circuitry 304 may retrieve the value by executing appropriate accessor methods to retrieve the value from the larger data structure.

At step 1206, control circuitry 304 proceeds to compare the value of the profile characteristic of interest to the content provider to the stored value of the user profile. In some embodiments, the user profile may be stored (e.g., on storage device 308) prior to beginning the algorithm. In some embodiments, the user profile may also be retrieved for each and every user profile characteristic, and the user profile may change from iteration to iteration. In some embodiments, control circuitry 304 may directly compare the user profile with the user profile characteristic by accessing the values respectively from memory and performing a value comparison. In some instances, control circuitry 304 may call a comparison function (e.g., for object to object comparison) to compare the user profile characteristic and the user profile.

At step 1208, control circuitry 304 compares the user profile characteristic and the user profile to determine whether the user profile characteristic matches the user profile by at least a threshold value. The threshold value may be accessed from memory or may be requested by control circuitry 304 from the content provider. If the condition is satisfied, the algorithm may proceed to step 1210; if the condition is not satisfied, the algorithm may proceed to step 1212 instead.

At step 1210, control circuitry 304 executes a subroutine to determine subscription terms based on the degree to which the profile characteristic matches the user profile based on the condition at step 1208 being satisfied. After the subroutine is executed, the algorithm may proceed to step 1218.

At step 1212, control circuitry 304 compares a number of users wishing to sign up for the content provider to a threshold number to, for example, a minimum number of users requested by the content provider. If the condition is satisfied, control circuitry 304 proceeds to step 1214; if the condition is not satisfied, control circuitry 304 proceeds to step 1216 instead.

At step 1214, control circuitry 304 executes a subroutine to determine subscription terms based on the number of users subscribing to the content provider based on the condition of step 1212 being satisfied. For example, control circuitry 304 may retrieve a subscription discount of 5% if a threshold number of users, as determined by the content provider, sign up for the subscription. After the subroutine is executed, the algorithm may proceed to step 1218 where it is determined whether all user profile characteristics are accounted for and whether further iterations are needed.

At step 1216, control circuitry 304 executes a subroutine to determine subscription terms based on standard subscription terms when both of the conditions in step 1208 and step 1212 are not satisfied. After the subroutine is executed, control circuitry 304 proceeds to step 1218.

At step 1218, control circuitry 304 checks whether all user profile characteristics are accounted for. If all of the instances have been evaluated, control circuitry 304 proceeds to step 1220. For example, control circuitry 304 may call a function to see whether there is a next user profile characteristic. If the function returns true (i.e., there are still instances that need to be processed), control circuitry 304 proceeds to step 1204.

At step 1220, control circuitry 304 executes a subroutine to transmit the subscription terms to the content provider in a first subscription request using communications network 414.

It is contemplated that the descriptions of FIG. 12 may be used with any other embodiment of this disclosure. In addition, the descriptions described in relation to the algorithm of FIG. 12 may be done in alternative orders or in parallel to further the purposes of this disclosure. For example, conditional statements and logical evaluations, such as those at 1208 and 1212, may be performed in any order or in parallel or simultaneously to reduce lag or increase the speed of the system or method. As a further example, in some embodiments several user profile characteristics may be evaluated in parallel, using multiple logical processor threads, or the algorithm may be enhanced by incorporating branch prediction. Furthermore, it should be noted that the algorithm of FIG. 12 may be implemented on a combination of appropriately configured software and hardware, and that any of the devices or equipment discussed in relation to FIGS. 3-4 could be used to implement one or more portions of the algorithm.

The pseudocode in FIG. 13 describes an algorithm to determine subscription terms based on a user profile and user profile characteristics in accordance with some embodiments of the disclosure. It will be evident to one skilled in the art that the algorithm described by the pseudocode in FIG. 13 may be implemented in any number of programming languages and a variety of different hardware, and that the style and format should not be construed as limiting, but rather a general template of the steps and procedures that would be consistent with code used to implement some embodiments of this disclosure.

At line 1301, control circuitry 304 executes the algorithm to run a subroutine to initialize variables and prepare to determine subscription terms, which begins on line 1305. For example, in some embodiments, control circuitry 304 may copy instructions from a non-transitory storage medium (e.g., storage device 308) into RAM or into the cache for processing circuitry 306 during the initialization stage. Additionally, in some embodiments the user profile being used for comparison may be retrieved, set, and stored at 1301.

At line 1305, control circuitry 304 receives instances of user profile characteristics of interest to the content provider. In some embodiments these instances may be retrieved from memory or via network communication with the content provider. Control circuitry 304 may receive user profile characteristics by receiving, for example, a pointer to an array of values of user profile characteristics. In another example, control circuitry 304 may receive an object of a class, such as an iterator object containing user profile characteristics.

At line 1306, control circuitry 304 iterates through the various user profile characteristics; if only a single instance is available, the loop will only execute once. This loop may be implemented in multiple fashions depending on the choice of hardware and software language used to implement the algorithm of FIG. 13; for example, this may be implemented as part of a "for" or "while" loop.

At line 1307, control circuitry 304 stores the user profile characteristic into a temporary variable "A." In some embodiments the user profile characteristic will be stored as part of a larger data structure or class, and the user profile characteristic may be obtained through appropriate accessor methods. In some embodiments the user profile characteristic may be converted from a string or other non-numeric data type into a numeric data type by means of an appropriate hashing algorithm. In some embodiments, control circuitry 304 may call a function to perform a comparison of the user profile characteristic to the user profile. In some embodiments the user profile characteristic may be encoded as a primitive data structure, and rather than using a temporary variable, the user profile characteristic may be directly used in the comparisons at lines 1309 and 1311.

At line 1308, control circuitry 304 stores the user profile into a temporary variable "B." Similar to the user profile characteristic, in some embodiments the user profile will be stored as part of a larger data structure or class, and the user profile may be obtained through accessor methods. In some embodiments, user profile data may be converted from a string or other non-numeric data type into a numeric data type by means of an appropriate hashing algorithm, or the user profile may be a primitive data structure, and may be directly used in the comparisons at lines 1309 and 1311.

At line 1309, control circuitry 304 compares the value of A to the value of B to see if A is similar to B by at least a threshold value. This is achieved by calling a function to calculate a degree of similarity between B from A, and then comparing the similarity value to a predetermined threshold value, or tolerance level. In some embodiments the tolerance level may be a set percentage of either A or B. In some embodiments the tolerance level may be a fixed number. For example, setting the tolerance level to a set multiple of machine epsilon may allow for the algorithm to account for small rounding errors that may result from the use of floating point arithmetic. In some embodiments the tolerance level may be set to zero, or the condition inside the IF statement may be replaced with a strict equivalence between A and B.

At line 1310, control circuitry 304 executes a subroutine to determine subscription terms based on the degree to which the user profile characteristic matches the profile of the user, if the condition in line 1309 is satisfied.

At line 1311, control circuitry 304 compares the value of A and B to determine if A and B are similar by less than a threshold value. In some embodiments this comparison will only be done if A is not similar to B by at least a threshold value and the comparison in line 1309 evaluates to FALSE.

At line 1312, control circuitry 304 executes a subroutine to determine subscription terms based on the number of users subscribing to the content provider if the condition in line 1311 is satisfied.

At line 1313, control circuitry 304 determines whether neither condition in line 1309 or 1311 are satisfied. If neither condition is satisfied, then the instruction at line 1314 is evaluated and executed.

At line 1314, control circuitry 304 executes a subroutine to determine subscription terms based on standard subscription terms if neither of the conditions at lines 1309 or 1311 are satisfied. For example, control circuitry 304 may determine subscription terms comprising no discount.

At line 1315, control circuitry 304 executes a subroutine to transmit subscription terms to the content provider in a subscription request using control circuitry 304 and communications network 414.

At line 1317, control circuitry 304 runs a termination subroutine after the algorithm has performed its function.

For example, in some embodiments, control circuitry 304 may destruct variables, perform garbage collection, free memory or clear the cache of processing circuitry 306.

It will be evident to one skilled in the art that the algorithm described by the pseudocode in FIG. 13 may be implemented in any number of programming languages and a variety of different hardware, and the particular choice and location of primitive functions, logical evaluations, and function evaluations are not intended to be limiting. It will also be evident that the code may be refactored or rewritten to manipulate the order of the various logical evaluations, perform several iterations in parallel rather than in a single iterative loop, or to otherwise manipulate and optimize run-time and performance metrics without fundamentally changing the inputs or final outputs. For example, in some embodiments break conditions may be placed after lines 1310 and 1312 to speed operation, or the conditional statements may be replaced with a case-switch. In some embodiments, rather than iterating over all user profile characteristics at step 1206, the code may be rewritten so control circuitry 304 is instructed to evaluate multiple user profile characteristics simultaneously on a plurality of processors or processor threads, lowering the number of iterations needed and potentially speeding up computation time.

Figure 14:
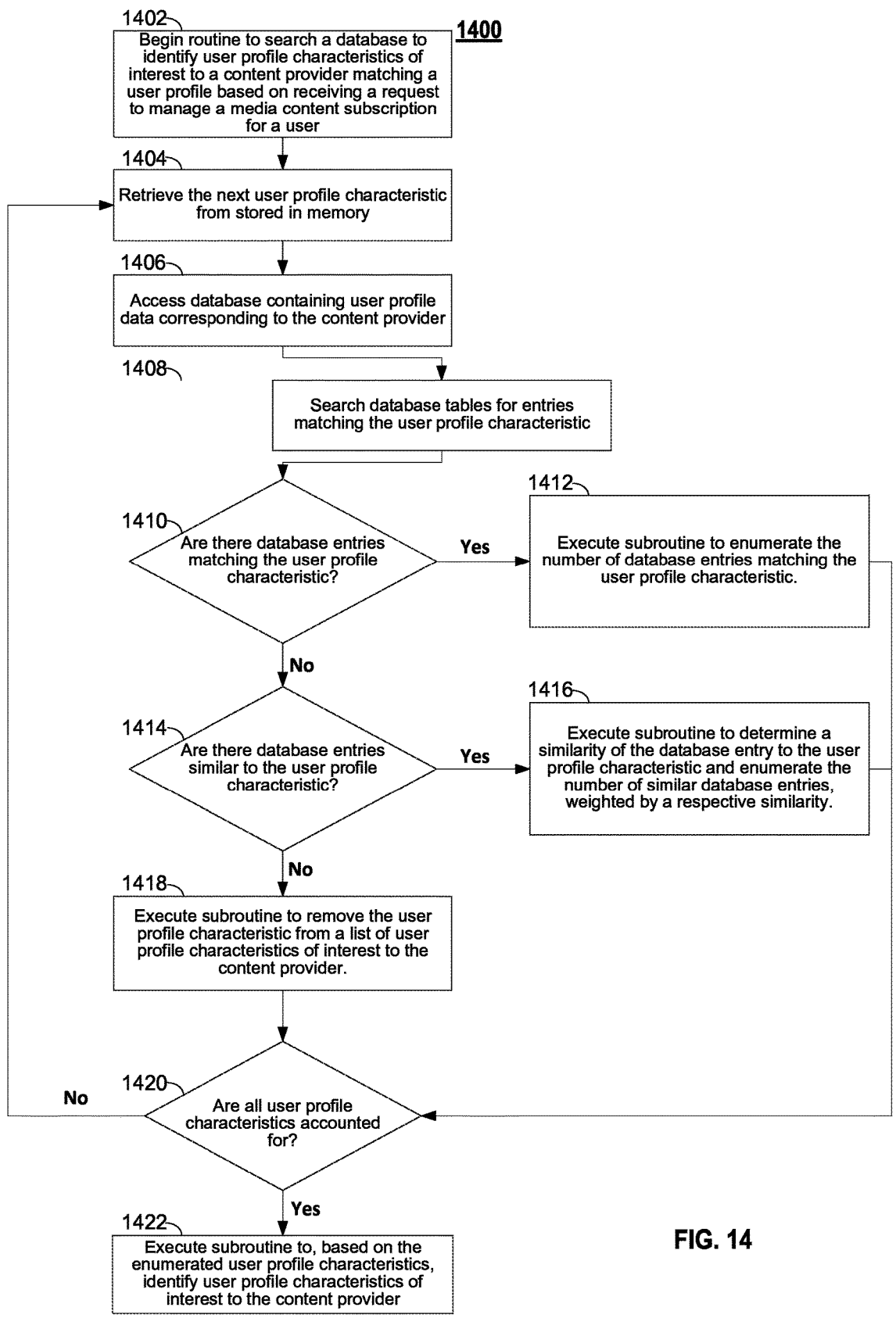
FIG. 14 is a flowchart of illustrative steps for searching a database to identify user profile characteristics of interest to a content provider matching a user profile in accordance with some embodiments of the disclosure.

FIGS. 14 and 15 present an algorithm for control circuitry (e.g., control circuitry 304) to search a database to identify user profile characteristics of interest to a content provider that match a user profile of a user, based on receiving a request to manage a media content subscription for the user in accordance with some embodiments of the disclosure. Based on the identified user profile characteristics of interest to the content provider that match the profile of the user, control circuitry 304 may determine subscription terms between the user and the content provider. Similar to the algorithms described by FIGS. 12 and 13, in some embodiments this algorithm may be encoded on to a non-transitory storage medium (e.g., storage device 308) as a set of instructions to be decoded and executed by processing circuitry (e.g., processing circuitry 306). Processing circuitry may in turn provide instructions to other sub-circuits contained within control circuitry 304, such as the tuning, video generating, encoding, decoding, encrypting, decrypting, scaling, analog/digital conversion circuitry, and the like.

The flowchart in FIG. 14 describes an algorithm for control circuitry (e.g., control circuitry 304) to identify user profile characteristics of interest to a content provider in accordance with some embodiments of the disclosure.

At step 1402, control circuitry 304 executes the algorithm to search a database to identify user profile characteristics of interest to the user will begin based on a request to manage a media content subscription for a user. In some embodiments, this may be done either directly or indirectly in response to a user action or input (e.g., from signals received by control circuitry 304 or user input interface 310.)

At step 1404, control circuitry 304 retrieves the next user profile characteristic from memory. In some embodiments, control circuitry 304 may retrieve a single primitive data structure that represents the user profile characteristic. In some embodiments, control circuitry 304 may retrieve the value from a larger class or data structure.

At step 1406, control circuitry 304 accesses a database containing user profile data corresponding to the content provider. In some embodiments, this database may be stored locally (e.g., on storage device 308) prior to beginning the algorithm. In some embodiments the database may also be accessed by using communications circuitry to transmit information across a communications network (e.g., communications network 414) to a database implemented on a remote storage device (e.g., media guidance data source 418).

At step 1408, control circuitry 304 searches database tables for entries matching a user profile characteristic. In some embodiments this may be done by comparing an identifier, for example, a string or integer representing the user profile characteristic, that matches the types of identifiers used inside the database. In some embodiments, control circuitry 304 may submit a general query to the database for table entries matching the user profile characteristic, and control circuitry 304 may receive a list of indices or a data structure containing a portion of the database contents. In some embodiments the database may implement a junction table that in turn cross-references entries from other databases. In this case, control circuitry 304 may retrieve indices from a first database that in turn can be used to retrieve information from a second database. Although we may describe control circuitry 304 interacting with a single database for purposes of clarity, it is understood that the algorithm of FIG. 14 may be implemented using multiple independent or cross-referenced databases.

At step 1410, control circuitry 304 determines if there are database entries matching the user profile characteristic. In some embodiments, control circuitry 304 may receive a signal from the database indicating that there are no matching entries. In some embodiments, control circuitry 304 may instead receive a list of indices or data structures with a NULL or dummy value. If control circuitry 304 identifies that there are database entries matching the user profile characteristic the algorithm proceeds to step 1412; otherwise, the algorithm proceeds to step 1414.

At step 1412, control circuitry 304 executes a subroutine to enumerate the number of database entries matching the user profile characteristic. Afterwards, the algorithm may proceed to step 1420 where it is determined if there are further user profile characteristics that need to be accounted for.

At step 1414, control circuitry 304 determines if there are database entries similar to the user profile characteristic. For example, in some embodiments, if the user profile characteristic is encoded as a string with multiple characters (e.g., a nationality), control circuitry 304 may perform additional database queries for similar strings with individual characters replaced, removed or added. In some embodiments, control circuitry 304 may also determine if the original query was a commonly misspelled word, and will submit a query with the correct spelling instead. In another example, the user profile characteristic may be encoded as an integer (e.g., an age or an income). Control circuitry 304 may perform additional queries for other integers within a certain range (e.g., a range of ages or incomes). In some embodiments, control circuitry 304 may retrieve database entries similar to the user profile characteristic without requiring further queries. If control circuitry 304 identifies that there are database entries similar to the user profile characteristic the algorithm proceeds to step 1416; otherwise, the algorithm proceeds to step 1418.

At step 1416, control circuitry 304 executes a subroutine to determine a similarity of the database entry to the user profile characteristic and enumerate the number of similar database entries, weighted by a respective similarity. Afterwards, the algorithm may proceed to step 1420.

At step 1418, control circuitry 304 executes a subroutine to remove the user profile characteristic from a list of user profile characteristics of interest to the content provider after determining that there were no matching database entries for the user profile characteristic. Afterwards, the algorithm may proceed to step 1420.

At step 1420, control circuitry 304 determines if all user profile characteristics are accounted for and if further iterations are needed. If further iterations are needed, the algorithm will loop back to step 1404 where control circuitry 304 will retrieve the next user profile characteristic. If no further iterations are needed, the algorithm will proceed to step 1422.

At step 1422, control circuitry 304 executes a subroutine to identify user profile characteristics of interest to the content provider, based on the enumerated user profile characteristics.

It is contemplated that the descriptions of FIG. 14 may be used with any other embodiment of this disclosure. In addition, the descriptions described in relation to the algorithm of FIG. 14 may be done in alternative orders or in parallel to further the purposes of this disclosure. For example, control circuitry 304 may submit multiple queries to the database in parallel, or it may submit multiple queries to a plurality of similar databases in order to reduce lag and speed the execution of the algorithm. As a further example, although step 1412 and step 1416 are described as being mutually exclusive, both exact entries and similar entries may be processed for a single instance of the user profile characteristic. To further this purpose, in some embodiments, step 1410 and step 1414 may be performed in parallel by control circuitry 304. Furthermore, it should be noted that the algorithm of FIG. 14 may be implemented on a combination of appropriately configured software and hardware, and that any of the devices or equipment discussed in relation to FIGS. 3-4 could be used to implement one or more portions of the algorithm.

The pseudocode in FIG. 15 describes an algorithm to identify user profile characteristics of interest to a content provider in accordance with some embodiments of the disclosure. It will be evident to one skilled in the art that the algorithm described by the pseudocode in FIG. 15 may be implemented in any number of programming languages and a variety of different hardware, and that the style and format should not be construed as limiting, but rather a general template of the steps and procedures that would be consistent with code used to implement some embodiments of this disclosure.

At line 1501, control circuitry 304 executes the algorithm to run a subroutine to initialize variables and prepare to identify user profile characteristics of interest to a content provider, which begins on line 1505. For example, in some embodiments, control circuitry 304 may copy instructions from a non-transitory storage medium (e.g., storage device 308) into RAM or into the cache for processing circuitry 306 during the initialization stage.

At line 1505, control circuitry 304 receives user profile characteristics of interest to a user. In some embodiments these instances may be retrieved from storage 308.

At line 1506, control circuitry 304 iterates through the user profile characteristics; if only a single instance is available, the loop will only execute once. This loop may be implemented in multiple fashions depending on the choice of hardware and software language used to implement the algorithm of FIG. 15; for example, this may be implemented as part of a "for" or "while" loop, in some programming languages. In some embodiments it may be convenient to store the user profile characteristics in a single class or encapsulated data structure that will perform the loop as part of an internal method.

At line 1507, control circuitry 304 queries a database for entries matching the user profile characteristic. Depending on how the database is implemented and how the user profile characteristic is stored, an intermittent step may be required to convert the user profile characteristic into a form consistent with the database. For example, the user profile characteristic may be encoded into a string or an integer using an appropriate hashing algorithm prior to being transmitted to the database by control circuitry 304 as part of a query. In some embodiments, the user profile characteristic may be encoded as a primitive data structure, and control circuitry 304 may submit the user profile characteristic as a query to the database directly. After querying the database, control circuitry 304 may receive a set of database entries matching the user profile characteristic. In some embodiments, control circuitry 304 may receive these entries in the form of a data-structure, a set of indices of the database, or a set of indices of another cross-referenced database.

At line 1508, control circuitry 304 determines if there are any database entries matching the user profile characteristic. In some embodiments, control circuitry 304 may determine this by checking if the database returned an empty data structure or a NULL value in response to the query in line 1507. If there are matching database entries, the algorithm may proceed to line 1509. If there were no matching database entries, the algorithm may instead proceed to line 1512.

At line 1509, control circuitry 304 executes a subroutine to enumerate all database entries matching the user profile characteristic using control circuitry 304. Afterwards, the algorithm may proceed to line 1514.

At line 1511, control circuitry 304 determines if there are any database entries similar to the user profile characteristic. For example, the user profile characteristic may be represented by an object of a class. Control circuitry 304 may call a function to perform a fuzzy comparison (e.g., a comparison to identify similar objects of the class) by comparing specific fields of the class or by performing approximate string matching on data related to the user profile characteristic. If database entries similar to the user profile characteristic are found by control circuitry 304, then the algorithm proceeds to line 1511. If control circuitry 304 does not find matching entries (e.g., a query to the database returns a NULL value), the algorithm proceeds to line 1512.

At line 1511, control circuitry 304 executes a subroutine to enumerate the number of similar database entries weighted by a similarity of the entry using control circuitry 304. Afterwards, the algorithm may proceed to line 1514.

At line 1512, control circuitry 304 determines that there were no database entries matching or similar to the user profile characteristic. In this case, the algorithm will proceed to line 1513.

At line 1513, control circuitry 304 executes a subroutine to remove user profile characteristics from a list of user profile characteristics of interest to the content provider using control circuitry 304. Afterwards, the algorithm may proceed to line 1514.

At line 1514, control circuitry 304 executes a subroutine to identify user profile characteristics of interest to the content provider based on the enumerated profile characteristics using control circuitry 304. For example, the control circuitry may identify the top ten user profile characteristics, based on the enumeration, as the profile characteristics of interest to the user.

At line 1516, control circuitry 304 executes a termination subroutine after the algorithm has performed its function and all user profile characteristics have been processed and checked against the database. For example, in some embodiments, control circuitry 304 may destruct variables, perform garbage collection, free memory or clear the cache of processing circuitry 306.

It will be evident to one skilled in the art that the algorithm described by the pseudocode in FIG. 15 may be implemented in any number of programming languages and a variety of different hardware, and the particular choice and location of primitive functions, logical evaluations, and function evaluations are not intended to be limiting. It will also be evident that the code may be refactored or rewritten to manipulate the order of the various logical evaluations, perform several iterations in parallel rather than in a single iterative loop, or to otherwise manipulate and optimize run-time and performance metrics without fundamentally changing the inputs or final outputs. For example, in some embodiments the code may be rewritten so control circuitry 304 is instructed to evaluate multiple user profile characteristics and submit multiple database queries simultaneously using a plurality of processors or processor threads. It is also understood that although we may describe control circuitry 304 interacting with a single database, this is only a single embodiment described for illustrative purposes, and the algorithm of FIG. 15 may be implemented using multiple independent or cross-referenced databases. For example, a database stored locally (e.g., on storage 308) may index or cross-reference a database stored remotely (e.g., media guidance data source 418), which may be accessible through any number of communication channels (e.g., communications network 414). In some embodiments, this may allow control circuitry 304 to utilize a look-up table or database front-end efficiently stored on a small local drive to access a larger database stored on a remote server on demand.

Figure 16:
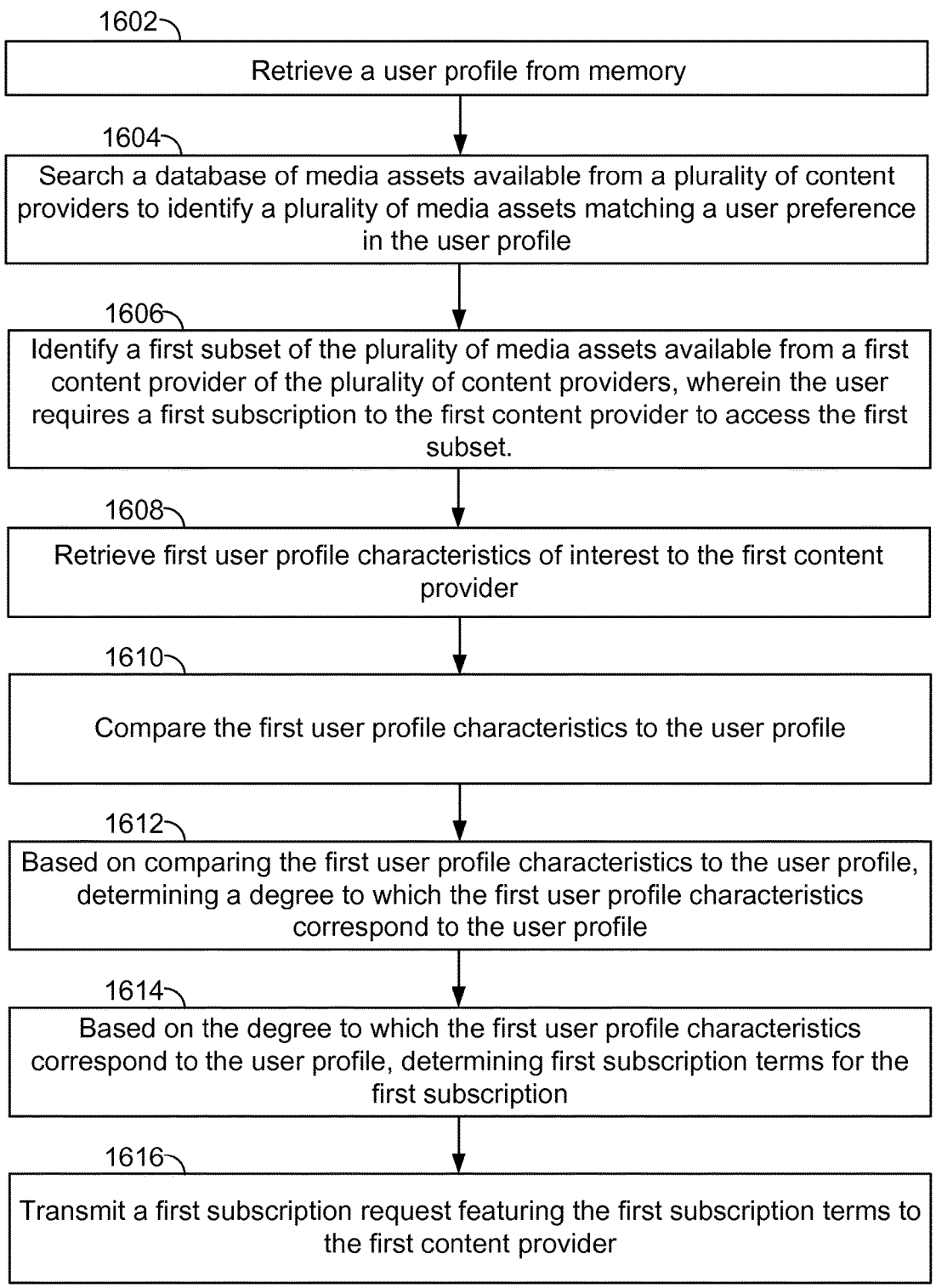
FIG. 16 is a flowchart of illustrative steps for determining subscription terms between a user and a content provider in accordance with some embodiments of the disclosure.

FIG. 16 depicts a flowchart of illustrative steps for generating for determining subscription terms in accordance with the present disclosure. It should be noted that process 1600, or any step thereof, could be performed on, or provided by, any of the devices shown in FIGS. 3-4 and 9. For example, process 1600 may be executed by control circuitry 304 as instructed by a media guidance application implemented on user equipment 402, 404, 406 in order to generate subscription terms. In addition, one or more steps of process 1600 may be incorporated into or combined with one or more steps of any other process or embodiment (e.g., process 500, 700, 1000, 1100, 1200 and 1400).

At step 1602, control circuitry 304 retrieves a user profile from memory. For example, control circuitry 304 may access a remote or local database (e.g., a database stored at media guidance data source 418 via communications network 414 or storage 308) comprising a user profile.

At step 1604, control circuitry 304 searches a database of media assets available from a plurality of content providers to identify a plurality of media assets matching a user preference in the user profile. For example, the media guidance application may access a database of media assets available from a plurality of content providers, such as a database stored at media guidance data source 418, to correlate metadata of media assets with data stored in a user profile. Control circuitry 304 may identify a plurality of media assets matching the user profile data.

At step 1606, control circuitry 304 identifies a first subset of the plurality of media assets available form a first content provider of the plurality of content providers, wherein the user requires a first subscription to the first content provider to access the first subset. For example, control circuitry 304 may analyze a content provider field associated with metadata of the media asset to identify a content provider of said media asset. Control circuitry 304 may associate each media asset with the content provider of the media asset. Control circuitry 304 may determine that a content provider of the plurality of content providers requires a subscription. For example, control circuitry 304 may query (e.g., via communications network 414) the content provider to determine whether a subscription to the content provider is required.

At step 1608, control circuitry 304 receives first user profile characteristics of interest to the first content provider. For example, control circuitry 304 may transmit a query (e.g., via communications network 414) to the content provider for user profile characteristics of interest to the content provider.

At step 1610, control circuitry 304 compares the first user profile characteristics to the user profile. For example, control circuitry 304 application may compare a user profile characteristic, such as an age, to the user profile by accessing an age field of the user profile stored in storage 308 and by making evaluating the equality of the age of the user to an age of interest to the content provider.

At step 1612, control circuitry 304 compares the first user profile characteristics to the user profile by determining a degree to which the first user profile characteristics correspond to the user profile. For example, control circuitry 304 may determine a degree by using a fuzzy matching algorithm to compare the user profile characteristic with data of the user profile. Control circuitry 304 may compute a score representative of a degree to which the user profile matches the user profile characteristics.

At step 1614, control circuitry 304 determines first subscription terms for the first subscription based on the degree to which the first user profile characteristics correspond to the user profile. For example, control circuitry 304 may identify that the user profile matches the user profile characteristic to a high degree (e.g., 90% out of 100%). Based on the determination that the user profile matches the user profile characteristic to a high degree, control circuitry 304 may determine subscription terms having a higher discount than the discount for a user matching with a low degree.

At step 1616, control circuitry 304 transmits a first subscription request featuring the first subscription terms to the first content provider. For example, control circuitry 304 may generate a packet for transmission over communications network 414 to the content provider comprising a first subscription request and first subscription terms computed by control circuitry 304.

It is contemplated that the steps or descriptions of FIG. 16 may be used with any other embodiment of this disclosure. In addition, the steps and descriptions described in relation to FIG. 16 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 and 9 could be used to perform one or more of the steps in FIG. 16.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiments in a suitable manner, done in different orders, or done in parallel. Furthermore, it should be noted that while a first step may be based on and/or in response to a second step, such a relationship does not preclude additional steps occurring between the first and second steps. In addition, the systems and methods described herein may be performed in real time. It should also be noted, the systems and/or methods described above may be applied to, or used in accordance with, other systems and/or methods.

What is claimed is:

1. A method of accessing content, the method comprising:
determining, with control circuitry, that a media asset of interest to a user is currently unavailable;
comparing the media asset with a database listing media assets that will become available from various content providers to identify a content provider from which the media asset will be available;
comparing the media asset with a database listing dates at which the media assets will become available from the content provider to determine, at a present time, a date at a future time at which the media asset will become available from the content provider, wherein the media asset is unavailable from the content provider at the present time;
comparing the date in a database listing date ranges associated with different subscription periods for the content provider to determine a subscription period that includes the date;
determining a start date for the subscription period;
determining the user is currently subscribed to the content provider;
determining an end date of a current subscription period of the user; and
generating for display, on the display screen, a reminder to the user to request access to the content provider on the end date.

2. The method of claim 1, further comprising requesting access to the content provider on the start date.

3. The method of claim 1, wherein the reminder notifies the user of the date at which the media asset becomes available from the content provider.

4. The method of claim 1, wherein the reminder includes a recommendation for an additional media asset that is similar to the media asset and available from the content provider before the date.

5. The method of claim 1, wherein the reminder includes a recommendation for an additional media asset that is currently available from the content provider.

6. The method of claim 1, wherein the reminder is generated for display on the display screen on the start date.

7. The method of claim 1, further comprising:
determining a number of days between the date and the start date; and
generating for display, on the display screen, media asset recommendations based on the number of days.

8. The method of claim 1, further comprising:
determining a day of the week between the date and the start date; and
generating for display, on the display screen, a recommendation for an additional media asset based on the day of the week.

9. The method of claim 1, further comprising:
determining a number of media assets that are of interest to the user that become available from the content provider during the subscription period;
comparing the number to a threshold number; and
based on the number exceeding the threshold number, selecting the subscription period.

10. A system for accessing content, the system comprising control circuitry configured to:
determine that a media asset of interest to a user is currently unavailable;
compare the media asset with a database listing media assets that will become available from various content providers to identify a content provider from which the media asset will be available;
compare the media asset with a database listing dates at which the media assets will become available from the content provider to determine, at a present time, a date at a future time at which the media asset will become available from the content provider, wherein the media asset is unavailable from the content provider at the present time;
compare the date in a database listing date ranges associated with different subscription periods for the content provider to determine a subscription period that includes the date;
determine a start date for the subscription period; and
determine the user is currently subscribed to the content provider;
determine an end date of a current subscription period of the user; and
generate for display, on the display screen, a reminder to the user to request access to the content provider on the end date.

11. The system of claim 10, wherein the control circuitry is further configured to request access to the content provider on the start date.

12. The system of claim 10, wherein the reminder notifies the user of the date at which the media asset becomes available from the content provider.

13. The system of claim 10, wherein the reminder includes a recommendation for an additional media asset that is similar to the media asset and available from the content provider before the date.

14. The system of claim 10, wherein the reminder includes a recommendation for an additional media asset that is currently available from the content provider.

15. The system of claim 10, wherein the reminder is generated for display on the display screen on the start date.

16. The system of claim 10, wherein the control circuitry is further configured to:
determine a number of days between the date and the start date; and
generate for display, on the display screen, media asset recommendations based on the number of days.

17. The system of claim 10, wherein the control circuitry is further configured to:
determine a day of the week between the date and the start date; and
generate for display, on the display screen, a recommendation for an additional media asset based on the day of the week.

18. The system of claim 10, wherein the control circuitry is further configured to:
determine a number of media assets that are of interest to the user that become available from the content provider during the subscription period;
compare the number to a threshold number; and
based on the number exceeding the threshold number, select the subscription period.

* * * * *